(12) United States Patent
Kang et al.

(10) Patent No.: US 12,511,023 B2
(45) Date of Patent: *Dec. 30, 2025

(54) OPERATING METHOD FOR MULTIPLE WINDOWS AND ELECTRONIC DEVICE SUPPORTING THE SAME

(71) Applicant: Samsung Electronics Co., Ltd., Gyeonggi-do (KR)

(72) Inventors: Doo Suk Kang, Gyeonggi-do (KR); Geon Soo Kim, Gyeonggi-do (KR); Dong Hyun Yeom, Gyeonggi-do (KR); Pil Joo Yoon, Gyeonggi-do (KR); Yong Joon Jeon, Gyeonggi-do (KR); Bo Kun Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/387,090

(22) Filed: Nov. 6, 2023

(65) Prior Publication Data

US 2024/0103699 A1 Mar. 28, 2024

Related U.S. Application Data

(63) Continuation of application No. 17/722,596, filed on Apr. 18, 2022, now Pat. No. 11,809,693, which is a (Continued)

(30) Foreign Application Priority Data

Oct. 18, 2013 (KR) .................. 10-2013-0124374

(51) Int. Cl.
*G06F 3/04842* (2022.01)
*G06F 3/04883* (2022.01)

(52) U.S. Cl.
CPC ...... *G06F 3/04842* (2013.01); *G06F 3/04883* (2013.01); *G06F 2203/04803* (2013.01)

(58) Field of Classification Search
CPC ............ G06F 3/04842; G06F 3/04883; G06F 3/0481; G06F 3/0484; G06F 3/14; G06F 2203/04803; G06F 3/048
See application file for complete search history.

(56) References Cited

U.S. PATENT DOCUMENTS 8,549,429 B2 10/2013 Tsuruta et al.
8,649,057 B2 2/2014 Tsuji et al.
(Continued)

FOREIGN PATENT DOCUMENTS

EP 2 469 388 A2 6/2012
EP 2 595 043 A2 5/2013
(Continued)

OTHER PUBLICATIONS

Korean Office Action dated Jul. 13, 2022.
(Continued)

*Primary Examiner* — Jeanette J Parker
(74) *Attorney, Agent, or Firm* — Cha & Reiter, LLC

(57) ABSTRACT

An electronic device including a touch-enabled display module configured to display a plurality of windows according to a multi-window mode; and a control module configured to displaying on the touch screen a first application window and a second application window according to the multi-window mode, alter the first application window in response to a touchscreen input received via the touch-enabled display, and automatically alter the second application window in response to the alteration of the first application window.

18 Claims, 12 Drawing Sheets

Related U.S. Application Data continuation of application No. 17/215,023, filed on Mar. 29, 2021, now Pat. No. 11,307,745, which is a continuation of application No. 16/223,254, filed on Dec. 18, 2018, now Pat. No. 10,963,139, which is a continuation of application No. 14/286,067, filed on May 23, 2014, now Pat. No. 10,162,494.

(56) References Cited

U.S. PATENT DOCUMENTS

| | | |
|---|---|---|
| 9,459,788 B2 | 10/2016 | Kang et al. |
| 9,928,028 B2 | 3/2018 | Jung et al. |
| 10,095,368 B2 | 10/2018 | Choi et al. |
| 2010/0088634 A1 | 4/2010 | Tsuruta et al. |
| 2010/0173677 A1 | 7/2010 | Fu |
| 2010/0275227 A1 | 10/2010 | Lee et al. |
| 2011/0134110 A1 | 6/2011 | Song et al. |
| 2011/0175930 A1 | 7/2011 | Hwang et al. |
| 2011/0265040 A1 | 10/2011 | Shin et al. |
| 2011/0289397 A1 | 11/2011 | Eastmond et al. |
| 2012/0071208 A1 | 3/2012 | Lee et al. |
| 2012/0159386 A1 | 6/2012 | Kang et al. |
| 2013/0027719 A1 | 1/2013 | Tsuji et al. |
| 2013/0120447 A1 | 5/2013 | Kim et al. |
| 2013/0127918 A1 | 5/2013 | Kang et al. |
| 2013/0147849 A1 | 6/2013 | Kwak et al. |
| 2013/0285906 A1 | 10/2013 | Jeon et al. |
| 2014/0033118 A1 | 1/2014 | Baird |
| 2014/0040742 A1* | 2/2014 | Park .................. G06F 3/0484 715/719 |
| 2014/0184526 A1 | 7/2014 | Cho |
| 2014/0195953 A1 | 7/2014 | Sakai et al. |
| 2014/0215214 A1 | 7/2014 | Bames et al. |
| 2014/0229888 A1* | 8/2014 | Ko .................. G06F 3/04842 715/783 |
| 2014/0237367 A1 | 8/2014 | Jung et al. |
| 2014/0285435 A1 | 9/2014 | Bezos |
| 2014/0310646 A1 | 10/2014 | Vranjes et al. |
| 2014/0325438 A1 | 10/2014 | Choi et al. |
| 2014/0337794 A1* | 11/2014 | Vranjes .................. G06F 9/451 715/800 |
| 2014/0351722 A1* | 11/2014 | Frederickson ........ G06F 3/0481 715/761 |
| 2015/0074589 A1 | 3/2015 | Pan et al. |
| 2019/0034042 A1 | 1/2019 | Choi et al. |
| 2021/0048854 A1 | 2/2021 | Kang et al. |

FOREIGN PATENT DOCUMENTS

| | | | |
|---|---|---|---|
| JP | 2010-259047 A | | 11/2010 |
| KR | 10-2006-0034118 A | | 4/2006 |
| KR | 10-2006-0038549 A | | 5/2006 |
| KR | 10-2010-0048297 A | | 5/2010 |
| KR | 10-2011-0064044 A | | 6/2011 |
| KR | 10-2011-0064417 A | | 6/2011 |
| KR | 20110064417 A | * | 6/2011 |
| KR | 10-2011-0117979 A | | 10/2011 |
| KR | 10-2011-0129750 A | | 12/2011 |
| KR | 10-2012-0070190 A | | 6/2012 |
| KR | 10-2013-0038753 A | | 4/2013 |
| KR | 10-2013-0054071 A | | 5/2013 |
| KR | 10-2013-0056674 A | | 5/2013 |
| KR | 10-2013-0064458 A | | 6/2013 |
| KR | 10-2014-0103634 A | | 8/2014 |
| KR | 10-2014-0127005 A | | 11/2014 |
| WO | 2014/104472 A1 | | 7/2014 |

OTHER PUBLICATIONS

European Search Report dated Nov. 3, 2017.
European Search Report dated Mar. 4, 2015.
Korean Search Report dated Jan. 10, 2020.
Korean Search Report dated Jun. 4, 2021.

* cited by examiner

OPERATING METHOD FOR MULTIPLE WINDOWS AND ELECTRONIC DEVICE SUPPORTING THE SAME

CROSS-REFERENCE TO RELATED APPLICATIONS

This application is a Continuation of U.S. patent application Ser. No. 17/722,596 filed on Apr. 18, 2022 and assigned U.S. Pat. No. 11,809,693 issued on Nov. 7, 2023, which is a Continuation of U.S. patent application Ser. No. 17/215,023 filed on Mar. 29, 2021 and assigned U.S. Pat. No. 11,307,745 issued on Apr. 19, 2022, which is a Continuation of U.S. patent application Ser. No. 16/223,254 filed on Dec. 18, 2018, and assigned U.S. Pat. No. 10,963,139 issued on Mar. 30, 2021, which is a Continuation of U.S. patent application Ser. No. 14/286,067 filed on May 23, 2014, and assigned U.S. Pat. No. 10,162,494 issued on Dec. 25, 2018, which claims priority to Korean Patent Application No. 10-2013-0124374, filed on Oct. 18, 2013, the disclosure of which is hereby incorporated by reference in its entirety.

TECHNICAL FIELD

The invention relates graphical user interfaces, and, more particularly, to the multiple-window operation of an electronic device.

BACKGROUND

Together with the recent development of digital technology, various electronic devices that are capable of communication and processing personal information, such as mobile communication terminals, personal digital assistants (PDAs), electronic notes, smart phones, and tablet personal computers (PCs) have been released. Such electronic devices do not remain confined to their respective traditional functions but are converging in that they include functions previously reserved for other types of terminals.

Typically, an electronic device may include call functions such as voice calls and video calls, message transmission/reception functions such as short message services (SMS) and e-mail services, electronic note functions, imaging functions, broadcast playback functions, moving picture playback functions, music playback functions, internet functions, messenger functions, and social networking service (SNS) functions.

The electronic devices may provide screens corresponding to functions in the form of windows. In addition, the electronic devices may display respective windows corresponding to a plurality of functions.

Typical electronic devices have been designed to display a plurality of windows on any predefined locations of a display unit. Thus, in an environment where a user uses a plurality of windows, a user may adjust the size and location of each window to check information properly.

SUMMARY

Various embodiments of the invention are directed to providing an operating method of a multiple window mode (or a multiple window function), and an electronic device supporting the same that adaptively controls the configuration of a plurality of windows to simplify user window manipulation.

According to one embodiment, an electronic device includes a display module configured to display a plurality of windows, provided as a result of performing functions, and a control module. If at least one of a display format or a display type of at least one specific window of a plurality of windows is changed in response to the occurrence of an event, the control module instructs the display module to change a display type of at least another of the plurality of windows, or display a window having a new function. When the control module instructs the display module to change the display type, a window is displayed that executes another program having the same or similar function as the previous window.

According to another embodiment, a method of operating a multi-window mode includes changing a display type of a first function-related window if a request for performing a second function is made while the first function-related window is displayed. The window with a changed display type is displayed, along with a window provided as a result of performing the second function.

According to yet another embodiment, a method of operating multiple windows includes displaying a plurality of windows provided as a result of performing functions, changing at least one of a display format of a first function-related window of the plurality of windows or a window display type according to executing another program having the same or similar function as the first function in response to the occurrence of an event, and changing the display type of a second function-related window of the plurality of windows in response to execution of another program having the same or similar functions as the second function, in response to the change of the first function-related window, or in response to displaying a new third function-related window.

The descriptions above provide the characteristics of various embodiments somewhat broadly so that a person skilled in the art may understand the embodiments disclosed through the detailed description of the various embodiments. In addition to such characteristics, further characteristics of various embodiments forming the subject of the claims will be understood through the detailed description that follows below.

BRIEF DESCRIPTION OF THE DRAWINGS

FIG. 5 illustrates an example screen interface related to another window display type to change for a method of operating multiple windows according to an;

FIG. 9 illustrates an example screen interface related to a designated window display type change for a method of operating multiple windows according to an;

DETAILED DESCRIPTION

Figure 1:
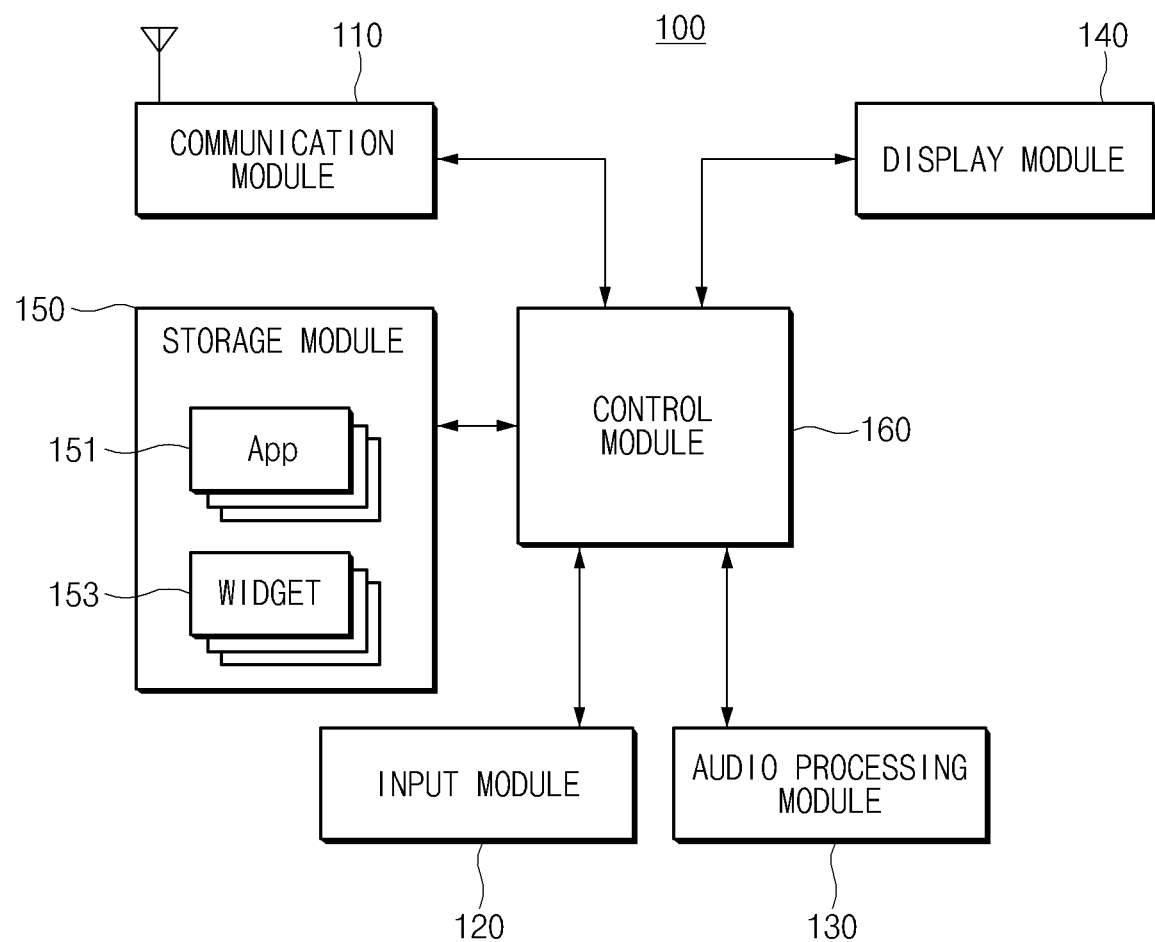
FIG. 1 is a schematic diagram of an example electronic device of an embodiment.

Various embodiments are described below in detail with reference to the accompanying drawings. In this case, it should be noted that the same components are represented by the same reference numerals in the drawings, if possible. Also, known functions and components that may obscure the subject matter are not described in detail. That is, it should be noted that only descriptions relevant for understanding operations according to various embodiments of the are provided below, and other descriptions are not provided in order not to obscure the subject matter of the invention.

In the following descriptions, an electronic device may include devices using an application processor (AP), a graphic processing unit (GPU), and a central processing unit (CPU), such as all information and communication devices, multimedia devices and related application devices that support functions described in various embodiments. For example, the electronic device may include mobile communication terminals operating based on communication protocols corresponding to various communication systems, as well as devices such as tablet personal computers (tablet PCs), smart phones, digital cameras, portable multimedia players (PMPs), media players, portable game consoles, and personal digital assistants (PDAs).

A "window," as used in the following descriptions may refer to a certain area within a graphical user interface on which information may be displayed after a function of the electronic device is performed. Such information may include various screen elements associated with the performing functions. For example, information may include at least one or more visual elements including texts, still images, moving pictures, icons, virtual key buttons, slide bars, progression bars, list items, or thumbnail items. In some embodiments, the window may be displayed in the form of a new layer disposed on the background screen. Multiple windows may be configured by dividing the upper layer area of the background screen into multiple layer areas, and displaying a plurality of windows on the divided layer areas. Alternatively, multiple windows may also be configured by pulling up some areas of a single window, or scaling the single window to a certain size and correspondingly displaying another window while the single window is displayed.

According to another embodiment, a window may be formed by updating a certain area of the background screen in order to display new information. For example, an electronic device may configure a window by removing information displayed on some areas of the background screen and displaying information on those areas after performing a specific function, or by overwriting information on some areas after performing a function. Multiple windows may be configured by dividing the background screen into a plurality of areas, and displaying on the divided areas information after performing a plurality of functions, or overwriting the information.

As described above, although the method of operating multiple windows and the electronic device supporting the same indicate an area to display information after performing a specific function in an electronic device as a window, the name of the area is not limited to the term "window." Thus, the term "window" should be understood to include various concepts related to an area for displaying information after performing a function, an information display layer, a pop-up window, a player, a screen, etc.

FIG. 1 is a schematic diagram of an example electronic device of an embodiment.

Referring to FIG. 1, an electronic device 100 may include a communication module 110, an input module 120, an audio processing module 130, a display module 140, a storage module 150, and a control module 160.

For the electronic device 100 having the configuration described above, if at least one of the display format or display type of a specific window in a multiple-window display environment is changed, it is possible to automatically change at least one of the display format or display type of another window. According to various embodiments, if a preset event occurs, the electronic device 100 may change the display type of a specific window designated by the event(for example, touchscreen input). Also, according to various embodiments, if at least one of the display form or display type of a specific window is changed, the electronic device 100 may automatically display a new window having a function associated with that window. In this case, the electronic device 100 may adjust the format and type of the new window in response to the change of the specific window. Through the display control of the window as described above, the electronic device 100 provides support so that a plurality of windows mutually and adaptively changes at least one of a display format or a display type, thereby enabling more convenient viewing of information displayed in each window.

According to one example embodiment, the change of the display type, as described above, may include a change of at least one: of a window size, a window shape, information arrangement in a window, or an information display size in a window. The display type corresponds to a window type, and may include, for example, an "app execution" type and a "widget execution" type, depending on the program being executed. The specific display type is based on a number of factors including, for example, the difference between template structures configuring windows for each program type, the size of an area configuring a window, the arrangement of a plurality of areas, the number of areas and the types of virtual key buttons included in at least one area, and the number of the virtual key buttons may be defined to be different between programs performing functions.

The communication module 110 may include at least one communication unit associated with the communication function of the electronic device 100. For example, the communication module 110 may include various communication units, such as a mobile communication unit, a broadcast receiving unit, and a local area communication unit. The electronic device 100 may display, on the display module 140, a call function related window associated with the voice call function support of the communication module 110. According to various embodiments, the electronic device 100 may display, on the display module 140, a web browser window associated with the web access function support of the communication module 110. According to various embodiments, the electronic device 100 may display, on the display module 140, a broadcast screen window associated with the broadcast receiving function of the communication module 110. According to various embodiments, the electronic device 100 may display, on the display module 140, an image screen window after receiving the streaming data by the communication module 110. According to various embodiments, the electronic device 100 may display, on the display module 140, a screen window after forming a local communication channel by the communication module 110.

The electronic device 100 may display, on the display module 140, a plurality of windows if the above-described multiple functions based on the communication module 110 are performed. The electronic device 100 may perform the size and location adjustment of windows corresponding to each function if a plurality of windows is displayed based on the communication module 110. For example, while one window is displayed as the entire screen, the electronic device 100 may adjust the display format or display type of a previous window if a request to display a new window is made. According to various embodiments, the electronic device 100 may adjust the display format or display type of a new window according to the number, display forms or types of previous windows that are being displayed.

The input module 120 may generate an input signal of the electronic device 100. The input module 120 may include at least one of a key pad, a dome switch, a (static pressure/capacitive) touch pad, a jog wheel, or a jog switch. The input module 120 may be implemented in a button form on the outside of the electronic device 100, and some buttons may be implemented as a touch panel. According to an embodiment, the input module 120 may include a plurality of keys for obtaining numeric or text information and setting various functions. Such keys may include a menu call key, a screen on/off key, a power on/off key, a volume control key, or a home key.

The input module 120 may generate an input signal requesting the activation of at least one function, an input signal to adjust the display type or display form of at least one window while multiple windows are displayed on the display module 140, and an input signal requesting the display of multiple windows on the display module 140. The input signal associated with requesting for displaying multiple windows may be generated by selecting a specific menu item or icon designed to simultaneously perform a plurality of functions. Alternatively, the input signal associated with requesting the display of multiple windows may be an input signal to further perform a specific function while a specific window is displayed. The input module 120 may generate an input signal to associate an "app" (i.e., an application) having a specific function with either a widget, or another app having another function. Also, the input module 120 may generate an input signal to associate a widget having a specific function with another widget or an app having another function.

The audio processing module 130 may process an audio signal of the electronic device 100. For example, the audio processing module 130 may transmit an audio signal input from the control module 160 to a speaker. The audio processing module 130 may perform the function of delivering an audio signal such as voice input from a microphone to the control module 160. The audio processing module 130 may convert an audio signal such as voice received from the microphone into a digital signal, and deliver the digital signal to the control module 160. According to an embodiment, the audio processing module 130 may output audio data associated with a specific window in an environment where multiple windows are displayed. Here, the audio processing module 130 may output audio data from a designated window among multiple windows. If the designated window is changed to designate another window, the audio processing module 130 may output audio data associated with the newly designated window.

According to various embodiments, if the display type or display form of a specific window is changed in a multiple-window display environment, the audio processing module 130 may output a guide sound or provide a sound effect in response to the change. Also, if a new window is displayed in a multiple-window display environment, the audio processing module 130 may also output audio data associated with a newly displayed window. Alternatively, the audio processing module 130 may also output audio data associated with a window of which the display form or display type is changed. The mechanism by which audio data is output on a plurality of windows being displayed on the display module 140 may be adjusted according to a variety of intentions or advantages, including the user's configuration preferences. Finally, outputting the audio data may, in some embodiments, be skipped entirely.

The display module 140 displays at least one of various windows corresponding to a function processed by the electronic device 100. For example, in a call mode(or call function), the electronic device 100 displays a call related user interface ("UI") or a call related graphic user interface ("GUI") in the form of a window. Also, when the electronic device 100 is in a video call mode or in an imaging mode(or imaging function), the display module 140 displays an image and/or received image, the UI or the GUI in the form of a window. According to an embodiment, the display module 140 displays an app window for various functions (or applications) that are executed on the electronic device 100. In addition, the display module 140 activates a virtual input device (for example, a virtual touch pad) according to the control of the control module 160 on the app window and delivers a signal input through the virtual input device to the control module 160. Also, the display module 140 may display a widget window after executing a widget. The widget window may be a screen element that is displayed on the display module 140 in response to the execution of a widget program stored in the storage module 150. Also, the app window may be a screen element that is displayed on the display module 140 in response to the execution of an app program stored in the storage module 150.

According to an embodiment, the display module 140 may display a plurality of app windows in response to at least one function. The app window may be a screen element that corresponds to activating a program that is provided in order to support a specific function. For example, the app window may be a call function-related window after performing a call function. The app window may be a memo function-related window after performing a memo function. The app window may be a video and/or animation-related window after playing video or animation.

According to various embodiments, the display format or display type of the app window may vary in response to an input event. For example, the app window may be a web browser window. If there is a request to play a specific video on the web browser window, the display module 140 may remove the web browser window and display an app window that is provided as a result of executing a video player. That is, the display module 140 may display an app window corresponding to another app having the same or similar function. The display module 140 may display app windows in a toggle manner. For example, a web browser-related first app window and a video-related second app window may be alternately displayed on the display module 140 according to the occurrence of an input event. According to an embodiment, if an event to remove a second app window in response to terminating video playback occurs, the display module 140 may display the web browser-related first app window.

According to various embodiments, the display module 140 may display at least one widget window. The display module 140 may display at least one widget window according to an execution setup or the input event. The display module 140 may adjust the size of a widget window according to the input event. According to various embodiments, the display module 140 may display at least one app window and at least one widget window. For example, the display module 140 may display an app window corresponding to a memo function and a widget window corresponding to a music play function. The display module 140 may adjust at least one of the size and arrangement of an app window or a widget window according to the control of the control module 160.

According to various embodiments, the display module 140 may display another window of which the display format or display type is adjusted, in response to a change in the display format or display type of a window being displayed. For example, while an app window having a first function and an app window having a second function are displayed, the display format or display type of the app window having the second function may be adjusted if the app window having the first function is changed to a widget window having the first function. According to an embodiment, the display module 140 may expand the size of the app window having the second function or arrange and display more information on an app window. According to various embodiments, the display module 140 may change and display the app window having the second function to a widget window having the second function by instruction from the control module 160.

In the descriptions above, the first function and the second function may be specific functions that are supported by the electronic device 100. For example, the first function and the second function may be various functions such as a camera related-function, a memo function, a document edit function, a search function, an image play function, a chatting function, etc. Also, the app window and the widget window may take forms having different window structures. According to an embodiment, a chatting app window and a chatting widget window may be implemented by different program operations and the windows may have different information arrangement structures. Alternatively, the chatting app window and the chatting widget window may be implemented by one program operation capable of supporting app and widget functions but have information arrangement structures in which the forms of windows displayed on the display module 140 are different.

If the display format or display type of a first function-related window is changed in a multiple-window environment, the display module 140 may display a new third function-related window via instruction from the control module 160. The new third function-related window may be a window that is provided as a result of the execution of the first function related app or widget. Alternatively, the new third function-related window may be a window that is provided as a result of the execution of the second function-related app or widget. The third function may be designed to be associated with the first function or the second function, designated by a user's setup or defined by a user history.

According to various embodiments, the display module 140 may display a plurality of windows, for example, two windows so that they fill the entire screen. For example, the display module 140 may display a plurality of windows over the entire screen. In this case, the display module 140 may divide the entire screen into areas and arrange a plurality of windows on the respective areas. Alternatively, the display module 140 may arrange a plurality of windows on respective areas of the entire screen and display a portion of a background area or at least a portion of the background screen on some areas. If the windows are arranged on the areas formed through the division, and the display format or the display type of a specific window is changed, the display module 140 may change and maintain the display format or display type of another window via instruction from the control module 160 so that the entire screen is utilized to display windows. Alternatively, the display module 140 may display a window related to a new function on empty or remaining areas, according to the change in the display format or display type. Accordingly, the display module 140 may have a full screen state in which the entire screen is filled with windows related to a plurality of functions. Alternatively, the display module 140 may also display background areas or a partial background screen on the remaining areas. The control module 160 may adjust the sizes of windows so that the entire screen is filled with a plurality of windows, even if the size of at least one of the windows is changed as described above. The control module 160 cause the display module 140 to display a background area or at least a portion of the background screen according to a size change of at least one of the windows.

According to various embodiments, the display module 140 may display a plurality of windows in a layered manner (in which layers corresponding to windows are stacked). For example, the display module 140 may display a first function-related window on the entire screen, and may display a second function-related window on the first function-related window, the second function-related window being smaller than the first function-related window. In addition, the display module 140 may have a full screen state wherein a plurality of windows are arranged on the entire screen, even if an adjustment is received for the display format or display type of either the first function-related window or the second function-related window, wherein the size of the window is changed.

The display module 140 may support a horizontal-mode screen display and a vertical-mode screen display according to the rotation direction (or arrangement direction) of the electronic device 100, and a screen switch display according to the change between the horizontal mode and the vertical mode. If the change between the horizontal mode and the vertical mode occurs in a multiple-window environment, the display module 140 may change the arrangement format or display type of the windows, correspondingly. Also, if the display format or display type of a specific window is changed in a multiple-window environment, the display module 140 may change a mode of a window from the horizontal mode to the vertical mode, or from the vertical mode to the horizontal mode automatically.

The display module 140 may include at least one of a liquid crystal display (LCD), a thin film transistor-LCD (TFT LCD), a light emitting diode (LED), an Organic LED (OLED), an active matrix OLED (AMOLED), a flexible display, a bent display, or a 3D display. Some of these displays may be implemented as transparent displays, or optically transferable(or transferable under visible light) to enable viewing of the outside.

Also, the display module 140 may be a touch screen, including a touch panel configured to function as an input device, in addition to a display output device. The touch panel may be configured to convert changes in pressure applied to a specific part of the display module 140, or changes in capacitance generated from a specific part of the display module 140, into an electrical input signal. The touch panel may be configured to detect pressure when a touch is performed, and identify the touched location and area. The display module 140 may include a touch panel and a display panel. The touch panel may be placed on the display panel. The touch panel may be implemented as an "add-on" type, in which the touch panel is placed on the display panel, or an "in-cell" type or an "on-cell" type, in which the touch panel is integrated into the display panel. The touch panel delivers to the control module 160 a user input responsive to a user gesture on the display module 140. Here, the user input may be generated by inputs from fingers or a touch unit, such as a touch pen. Input gestures may include, for example, a touch, multiple touches, a tap, double taps, a long tap, tap and touch, drag, a flick, a press, pinch in, and pinch out. The above-described user inputs may be defined and used as input signals requesting the display of multiple windows, requesting a change in the display form or display type of a specific window while displaying multiple windows, requesting the removal of the display of the specific window, etc.

The storage module 150 may store the app 151, the widget 153, or a program for processing or controlling the control module 160.

The app 151 may include program routines supporting various functions that the electronic device 100 supports. For example, the app 151 may include various apps, such as a music play function supporting app, a moving-picture play function supporting app, a file edit function app, a camera function app, a chatting function app, a game function app, an alarm app, a web browser app, a gallery app, a calculator app, a voice search app, a map app, a weather app, etc. The app 151 may be activated in response to an execution request and display a corresponding screen on the display module 140 in the form of a window.

The widget 153 may include widget routines supporting various functions that the electronic device 100 supports. For example, the widget 153 may include various widgets, such as a weather widget, an alarm widget, a chatting widget, a message widget, a memo widget, a music play widget, etc. The widget 153 may be configured by using specific program routines or may be configured by some routines of the app 151 above. A widget 153 may be provided to display information differently from a standard app window. The information may, for example be arranged differently, or displayed in a different structure.

The app 151 and the widget 153 may be provided as menu items or provided as icons on a standby screen or a menu screen. Here, the icons may have a constant size or have various sizes according to preference or design.

The storage module 150 may store information on at least one of program related to a specific function. The program related to a specific function may be functions performed according to the change in the display format or display type of at least one window in a multiple-window environment. The storage module 150 may store a list of programs related to specific functions. For example, the storage module 150 may store a list of app programs, a list of widget programs, a list of popup programs that are related to a memo function.

The control module 160 may change a window related to a specific function to a window provided as a result of executing another program having the same or similar function based on a list of related programs. Alternatively, related program information may be included and stored in each program. For example, a memo app program may include information capable of calling a memo widget program as a related program.

The above-described storage module 150 may include, as a storage medium, at least one of memories including flash memory type, hard disk type, micro type and card type (for example, secure digital (SD) card or extreme digital (XD) card), and other types of memories including a random access memory (RAM), a static RAM (SRAM), a read-only memory (ROM), a programmable ROM (PROM), an electrically erasable PROM (EEPROM), a magnetic RAM (MRAM), a magnetic disk or an optical disk type memory. The electronic device 100 may operate along with a web storage that performs a storage function of the storage module 150 over the internet.

The control module 160 may support displaying a menu screen or a standby screen related to at least one app 151 and at least one widget 153 that are stored in the storage module 150. The control module 160 may display at least one window in response to selecting at least one specific function on the standby screen or the menu screen. For example, the control module 160 may display an app window in response to selecting the app 151. The control module 160 may display a widget window in response to requesting to execute a specific widget 153. The control module 160 may support a multiple-window environment, for example, an environment to display a plurality of app windows, an environment to display a plurality of widget windows, and an environment to display at least one app window and at least one widget window.

According to an embodiment, when changing the display format or display type of a specific window in a multiple-window environment in response to the occurrence of an input event, the control module 160 may perform a change in the display format or display type of another window. The control module 160 may perform delivering execution information such as, for example, activity when performing a switch between windows having different display types. Here, the execution information may be information related to a function being executed in a specific app. For example, the execution information may include type and play time point information on a specific music source, channel information on a specific broadcast, etc. The execution information may include information on texts or images made when executing a specific app, information on the executed page or executed part of a specific app, information on a web access of a specific app, etc. Even if a switch between windows having different display types occurs based on the delivery of the execution information, the control module 160 may support the transition so that the current window being displayed after the switch maintains the same function as the previous window. To illustrate, a transition between a music player app and music player widget may occur seamlessly so that the user does not experience any disturbances in the playback of music. For example, the control module 160 may perform delivering the execution information when performing a switch between app windows, a switch between widget windows, a switch from an app window to a widget window, or a switch from a widget window to an app window to enable the same function to be maintained.

According to various embodiments, the control module 160 may display a window related to a new function when changing the display format or display type of a specific window in a multiple-window display environment. Such a control module 160 may include a configuration as shown in FIG. 2 for supporting the operation of multiple windows.

Although it is described in the example embodiments that the window formats of an app and a widget for a specific function are different, various embodiments are not limited thereto. That is, examples of the app and the widget are presented to show that a display type is changed as structural arrangement of information within or regarding a window is changed. For example, in some situations, a single app may utilize app windows with different display types supporting the same function, particularly when different developers manufacture the apps covering the same functionality. Likewise, widgets covering the same function may have different display types, formats and visual structures supporting the same function, depending on the developer's intention, design choices and policy. The function of operating multiple windows may have an optimum display state because the display forms or display types of multiple windows are changed through association in response to an input signal.

On the other hand, various embodiments described may be implemented in a recording medium that may be read with a computer or a similar device by using software, hardware or a combination thereof. According to a hardware implementation, the embodiments described in the may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or other electrical units for performing functions. In some cases, the embodiments described in the specification may be implanted as the control module 160 itself. According to a software implementation, embodiments such as the procedures and functions described in the specification may be implemented in separate software modules. Each of the software modules may perform one or more functions and operations that are described in the specification.

Figure 2:
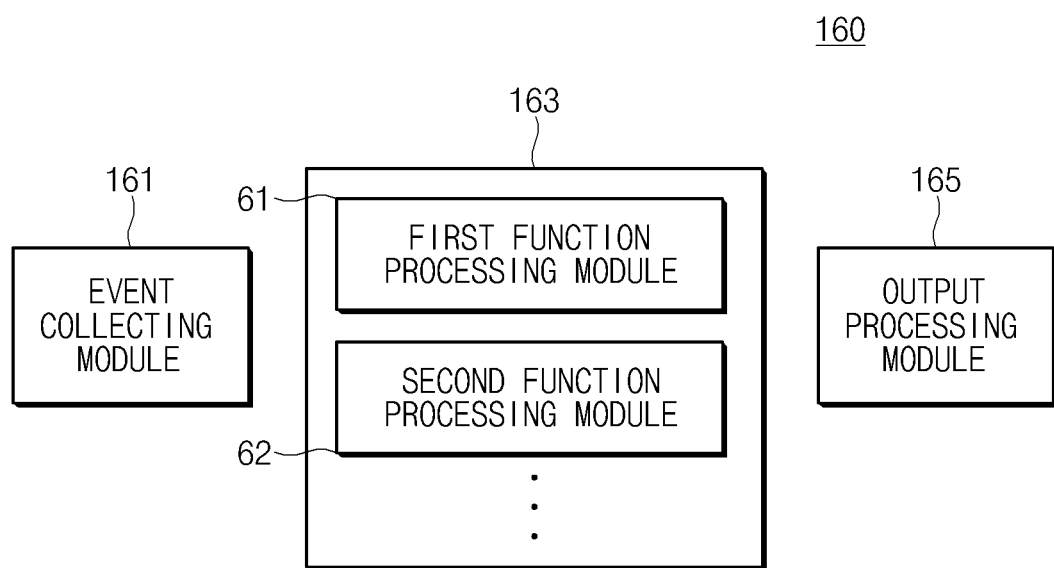
FIG. 2 is a schematic diagram of an example control module of an embodiment.

FIG. 2 is a schematic diagram of an example control module of an embodiment.

Referring to FIG. 2, the control module 160 may include an event collecting module 161, a function processing module 163, and an output processing module 165.

The event collecting module 161 may collect events that the electronic device 100 generates. For example, the event collecting module 161 may collect input signals generated from the input module 120 as events. The event collecting module 161 may control the power supply of a touch panel for supporting the input function of the display module 140. The event collecting module 161 may collect touch events generated from the display module 140 having the input function. If the electronic device 100 supports voice recognition and command functions, the event collecting module 161 may activate a microphone correspondingly and collect voice recognition events. The event collecting module 161 may collect sensor information corresponding to gestures as events, if the electronic device 100 provides various sensors. For example, the event collecting module 161 may collect, as an event, at least one piece of information generated from at least one sensor, such as acceleration sensing information, geomagnetic sensing information, contact or pressure sensing information, etc. The events collected by the event collecting module 161 may be provided to the function processing module 163.

The function processing module 163 may be a module that processes each function. The function processing module 163 may allocate a processing module related to a specific function according to an event that the event collecting module 161 provides. For example, the function processing module 163 may allocate a first function processing module 61 if receiving an event requesting to execute a first function from the event collecting module 161. Also, the function processing module 163 may allocate a second function processing module 62 if receiving an event requesting to execute a second function from the event collecting module 161 while the first function is executed. The function processing module 163 may deliver a specific event received from the event collecting module 161 to the first function processing module 61 or the second function processing module 62.

According to various embodiments, when the first function and the second function are executed, the function processing module 163 may allocate another processing module if it receives a request to execute another function. As described above, the operation of the function processing module 163 is not limited to the number of functions and a further function processing module 163 may be further allocated as needed.

According to various embodiments, the function processing module 163 may automatically allocate a processing module related to executing a third function in response to a change in a display format or a display type. The function processing module 163 may allocate a processing module related to executing a predefined third function if, for example, a change in the display form or display type of a window related to the first function or the second function is requested.

The first function processing module 61 may perform data processing related to the first function for which an execution request is made. For example, the first function processing module 61 may support processing for any one of the various functions supported by the electronic device 100, such as a music play function, a broadcast receiving function, a web access function, a file edit function, etc. In this case, the first function processing module 61 may control the play of a specific music file designated by a delivered event. The first function processing module 61 may deliver, to the output processing module 165, various pieces of data related to supporting the first function constituting, for example, first function related window data and audio data. The first function related window data may include various pieces of data displayed on the display module 140 for the first function while the first function is executed. According to an embodiment, the first function processing module 61 may activate a first function related app and deliver app window data to the output processing module 165 in response to activating the app.

According to various embodiments, the first function processing module 61 may request the output processing module 165 to change the display format or display type of an app window in response to a delivered event. For example, the first function processing module 61 may deliver first function related widget window data, to the output processing module 165, in response to a delivered event. In this case, the first function processing module 61 may request the output processing module 165 to delete an app window previously displayed on the display module 140.

According to an embodiment, while delivering first function related widget window data or app window data to the output processing module 165, the first function processing module 61 may deliver, to the output processing module 165, data on another app window having a first function in response to the occurrence of an event. Here, the first function processing module 61 may request the output processing module 165 to delete a previously displayed widget window from the display module 140.

According to an embodiment, while delivering first function related widget window data or app window data to the output processing module 165, the first function processing module 61 may deliver to the output processing module 165 data on another app window having a first function in response to the occurrence of an event. The another app window having the first function may be a window of an app that supports the same function such as, for example, a music playback function that utilizes a different execution program, as previously mentioned. In another example, the music play function may be performed by using various apps, such as a web browser app, a music play app, a moving-picture app, etc. Apps may have different app window forms according to user's setup or design forms of corresponding programs. Also, the music playback function may be performed by at least one of a plurality of music playback apps developed by different developers or companies. Here, the music playback apps may have different window forms according to the designer's intent and design decisions, or the user's preferences or setup configuration.

The second function processing module 62 may perform data processing related to a second function that is different from the first function. For example, the second function processing module 62 may support processing a memo function. The second function processing module 62 may deliver screen window data related to supporting the memo function to the output processing module 165. In response to an event delivered by the event collecting module 161, the second function processing module 62 may request that the output processing module 165 adjust the window display format or display type of a corresponding function.

The output processing module 165 may display a specific window to the display module 140 based on data delivered from at least one of the first function processing module 61 or the second function processing module 62. For example, the output processing module 165 may receive the first function-related window data from the first function processing module 61. The output processing module 165 may display the first function-related window on the entire screen of the display module 140 if a separate function-related window is not displayed on the display module 140. Alternatively, the output processing module 165 may display the first function-related window with a user-defined size or a default size. The output processing module 165 may perform the screen division or area division of the display module 140 and display windows on the areas formed through the division, if there is a request for displaying a plurality of windows such as, for example, a first function related window and a second function related window. In this case, the screen division may be configured so as screen area is divided equally or unequally. Alternatively, the output processing module 165 may display the first function-related window on the entire screen and overlay the second function-related window on the first function-related window. In this case, the output processing module 165 may display the windows so that the second function-related window covers a portion of the first function-related window. Alternatively, the first function-related window and the second function-related window may be displayed to occupy the entire area of the display module 140.

According to an embodiment, the output processing module 165 may display the windows so that the first function-related window that is earlier displayed is larger or smaller than the second function-related window that is later displayed. According to various embodiments, the output processing module 165 may display windows so that a window having a function having relatively higher execution frequency or higher priority than other functions is larger or smaller than windows having other functions in a multiple-window environment. According to various embodiments, the output processing module 165 may control windows so that windows related to simultaneous execution functions are displayed with the same size.

In response to a request for changing the display format or display type of a specific window in a multiple-window environment, the output processing module 165 may perform a change in the display form or display type of a corresponding window and may change the display format or display type of another window. According to an embodiment, the function processing module 163 may support performing a new third function in response to a change in the display type or display form of a first function-related window or a second function-related window. The output processing module 165 may receive third function-related window data from a processing module related to processing the new third function. The output processing module 165 may display the third function-related window on the display module 140 based on the received third function-related window data. In this case, the output processing module 165 may display the third function related window on a certain area that is provided in response to a change in the display form or display type.

As described above, the electronic device 100 according to various embodiments of the may include the display module 140 that displays a plurality of windows provided as a result of executing functions, and the control module 160 that controls the display module so that if at least one of the display form or display type of at least one of the windows is changed in response to the occurrence of an event, at least one of the display form or display type of at least another of the windows is changed or a window having a new function is displayed. Here, the control module 160 may control the display module so that when the display type is changed, a window provided as a result of executing another program having the same or similar function as that of the previous window is displayed.

The operation of multiple windows may be described according to the operation of the control module of a specific electronic device. That is, while displaying a first function-related window on the display module, the control module of the electronic device may control data processing so that the display type of the first function-related window is changed and a window performing a second function is simultaneously displayed if there is a request for performing another function. Also, the operation of multiple windows may be described as the operation of the display module of the electronic device. That is, while displaying the first function-related window, the display module may display the second function-related window in response to data processing and display a changed window that is formed by changing the display type of the first function-related window, together with the second function-related window.

Also, the above-described 'output' may be understood as displaying data on the display module in addition to delivering data from the control module to the display module. For example, the embodiments described may also be applied to when the control module and the display module are provided on physically separate spaces. In this case, the control module may output a window change of multiple windows to an external display device and a display device may display window-related data from the electronic device. Such embodiments may be applied, for example, between an electronic device such as a smart watch and an electronic device such as a smart pad or a smart phone. Thus, in addition to window adjustment through data processing between the control module and the display module that are arranged in one device, the operation of multiple windows may be equally applied to window adjustment in an external accessory device that is remote from the control module and receives data from the control module by using at least one of wired or wireless schemes.

According to various embodiments, the display module 140 may arrange a plurality of windows on the entire screen, there being divisions to display a full screen including the windows, or the display module 140 may arrange the windows without any overlay, and then display at least some of the background area when displaying the arranged windows.

When an input is detected to change the size of a specific window, the control module 160 may alter the size of a window and control the relative sizes of adjacent windows to adapt to the new screen configuration. If a size change of the specific window exceeds a certain level, the control module 160 may execute another program having the same or similar function as a function in the specific window, and then display a window for the other program in place of the specific window. This process may be repeated for the new window as well, wherein if the size of the new window is altered to exceed a certain level, the control module 160 may display another window having yet another new function.

According to various embodiments, the electronic device 100 may further include a storage module that stores associated information on another function associated with the another window-related function or the specific window-related function.

According to various embodiments, the control module 160 may perform a function pre-associated to the another window-related function or the specific window-related function based on the associated information, and control the display module so that a window having a new function provided as a result of executing the function is displayed.

The control module 160 may change the size of a specific window to a preset size in response to the occurrence of an event, and control the display module so that a window having a new function is displayed according to the sizes of empty areas generated in response to the change.

According to various embodiments, the control module 160 may execute a program having a new function with a different display type based on the associated information according to the sizes of the empty areas.

According to various embodiments, the control module 160 may adjust the size of another window having the changed display type in response to the occurrence of an event.

According to various embodiments, the control module 160 may again change the display type of a specific window or another window having the changed display type in response to the occurrence of an event.

Figure 3:
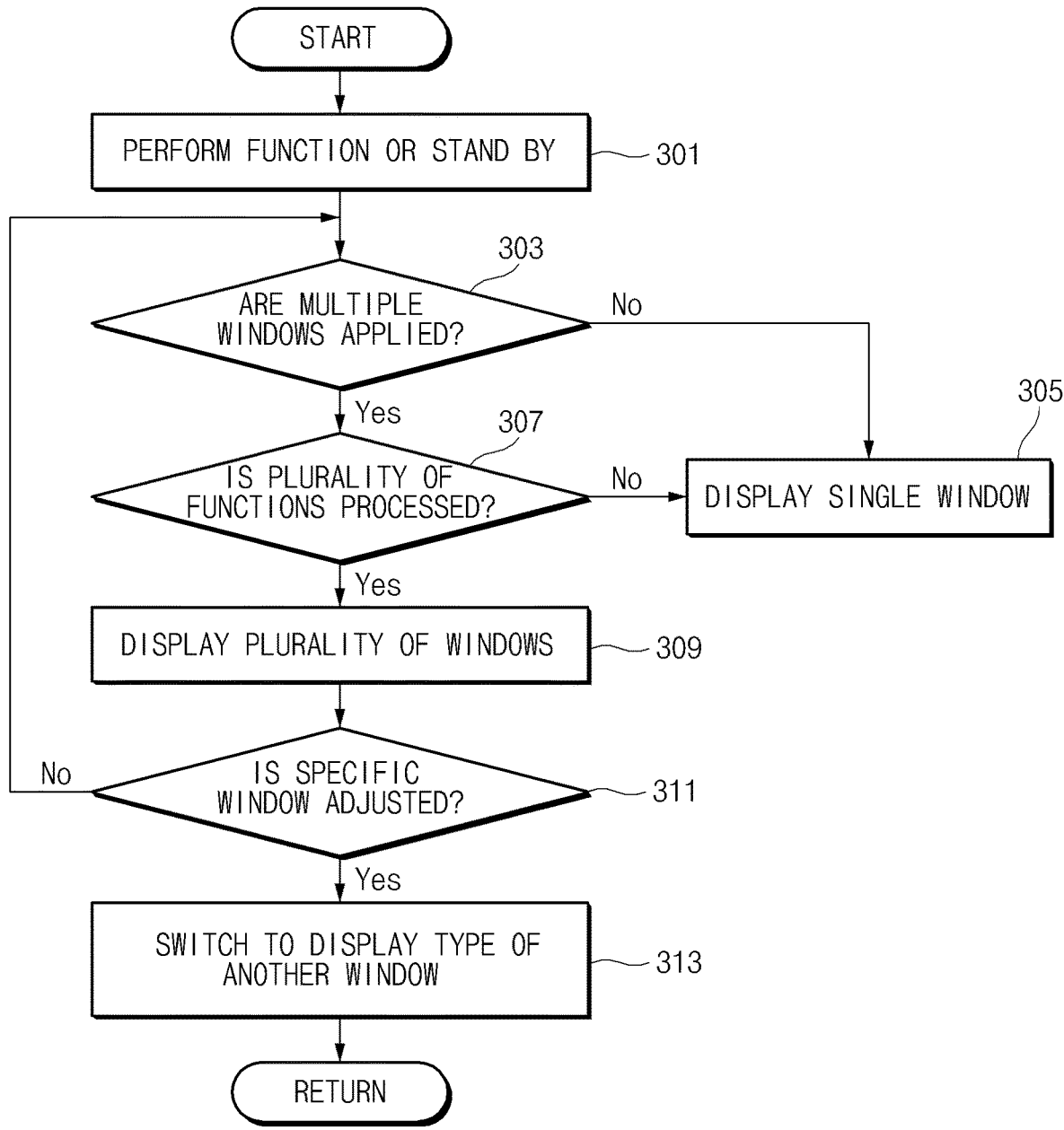
FIG. 3 is a flowchart illustrating an example method of operating multiple windows of an electronic device according to an embodiment.

FIG. 3 is a flowchart illustrating an example method of operating multiple windows of an electronic device according to an embodiment.

Referring to FIG. 3, the control module 160 may first perform operation of a function, or wait for a function in operation 301. In this case, the control module 160 may display a standby screen or a predefined menu screen on the display module 140. Alternatively, the control module 160 may display, on the display module 140, a window corresponding to specific function execution in response to a user input. Application of a multiple window mode(or multiple window function) may be selectively performed in response to the icon selection of a designated menu item or items. If the operation of the multiple window mode is not applied, a specific function related window that is requested to execute or selected may be displayed on the entire display module 140 in a full screen configuration. If the operation of the multiple window mode is applied, the windows may be arranged on certain areas of the screen of the display module 140 such that the windows fill the entire display module 140, the windows may be arranged so that at least some of the background areas or background screen is displayed. Certain information may be displayed on some background areas or background screen.

In operation 303, for example, the control module 160 may check whether there is a setup or an event for applying multiple window mode. The electronic device 100 may provide icons or menu items related to applying the multiple window mode. Alternatively, the electronic device 100 may be designed so that the multiple window mode is applied by default. For example, if a video playback function or a call function is performed, the electronic device 100 may perform, by default, application of the multiple window mode. In operation 303, if there is no setup or event for applying the multiple window mode, the control module 160 may proceed to operation 305 to support executing a specific function based on a single window display mode. In single window display mode, the control module 160 may display any window related to a function to be executed or a designated function on the entire screen of the display module 140. Accordingly, a window related to another function that is being executed or loaded may be entirely hidden by the window currently displayed on the entire surface of the display module 140.

If there is an event or setup step for applying the multiple window mode in operation 303, the control module 160 may check whether there is a need to process a plurality of functions in operation 307. In this operation, the control module 160 may check whether there is a need to execute a plurality of functions and display multiple windows. As long as a single function is being executed in operation 307, the control module 160 may support a single window display as in operation 305, as there is no need to display multiple windows.

If it is determined that a plurality of functions is being executed in operation 307, the control module 160 may perform a multiple-window display of the functions in operation 309. For example, the control module 160 may perform a first function-related window display for an executing first function and a second function-related window display for an executing second function. The control module 160 may display the first function-related window and the second function-related window so that they are displayed on certain areas of the display module 140. In this operation, the control module 160 may collect preset window size information for the first function-related window display and preset size information for the second function-related window display. The control module 160 may display the first function-related window and the second function-related window on the entire display module 140 at a ratio defined by the collected preset size information.

According to other embodiments, the control module 160 may check size information on the first function-related window to be displayed in a multiple-window environment and display the window with a corresponding size on the display module 140. The control module 160 may display the second function-related window in empty areas not utilized by the first function-related window after the first function-related window is displayed.

According to other embodiments, while displaying the first function-related window, the control module 160 may collect size information on the second function-related window to be applied in a multiple-window environment, if a request for displaying the second function-related window is made. The control module 160 may display the second function-related window on the display module 140 according to the size information on the second function-related window, and adjust the size of the first function-related window to be suitable for empty areas of the display module 140 not occupied by display of the second function-related window.

According to other embodiments, if a request for displaying the second function-related window is made while displaying the first function-related window, the control module 160 may select the display type of the second function-related window according to the size information on the first function-related window to be applied in a multiple-window environment. For example, the control module 160 may display an app window having a certain information arrangement for the second function, or display a widget window having a structure or an information arrangement that is different from the app window.

According to other embodiments, if a request for displaying the second function-related window is made while displaying the first function-related window, the control module 160 may change the display type of the first function-related window according to the size information on the second function-related window to be applied in a multiple-window environment. For example, the control module 160 may maintain a first function-related window display or may display a first function-related window having a structure or an information arrangement that is different from the previously displayed window.

In operation 311, the control module 160 may check whether there is an event related to adjusting a specific window. If there is no even the control module 160 may return operation 303 and again perform the operations related to adjusting the specific window. On the other hand, if there is an event, the control module 160 may perform updating an information display state in response to the event, and support executing a function related to the specific window. For example, it is possible to update information, input texts, or edit items according to link selection on a window having a specific function.

In operation 313, the control module 160 may perform a switch to another window display type in response to the event related to adjusting the specific window. According to one embodiment, while displaying the first function-related window and the second function-related window, an event for adjusting the size of the first function-related window may occur. For example, a touch drag event may be detected, indicating a desired size adjustment of the first function-related window. In response, the control module 160 may change the display type of the second function-related window. According to one embodiment, the control module 140 may change a second function-related app window designed to respond to app execution, to a second function-related widget window. Alternatively, the control module 160 may change the second function-related widget window designed to respond to widget execution, to the second function-related app window.

As described above, the method of operating the multiple windows according to various embodiments may include changing the display type of the first function-related window and displaying the changed window, and a window provided as a result of executing the second function, if a request for executing the second function is made while the first function-related window is displayed.

Here, in addition to window adjustment in one device, the method of operating the multiple windows as described herein may be applied to window adjustment in an external accessory device that is remote from the control module and receives data from the control module by using at least one of a wired or wireless network schemes. For example, although the change operation and the display operation, as described above, may be performed in one electronic device, they may also be performed in separate electronic devices, respectively. According to one embodiment, an electronic device such as a smart watch, a smart necklace or a smart bracelet may receive and output multiple-window-related data from an electronic device such as a smart pad or a smart phone. In this operation, the electronic device such as the smart pad or the smart phone may process and output multiple-window-related data, and the smart watch may display received multiple-window-related data.

According to various embodiments, the change operation may include changing the display type of the first function-related window according to the size information on the second function-related window that is to be applied in the multiple-window environment.

According to various embodiments, the display operation may include any one of displaying the second window-related window according to the size information on the second function-related window to be applied in a multiple-window environment, and displaying a window formed by changing the display type to one suitable for display in non-occupied empty areas on the display after the second function-related window is displayed, and selecting the display type of the second function-related window according to the size information of the first function-related window.

According to various embodiments, the display operation may include displaying the second function-related window as suitable for empty display areas, after displaying a window formed by changing the display type.

Figure 4:
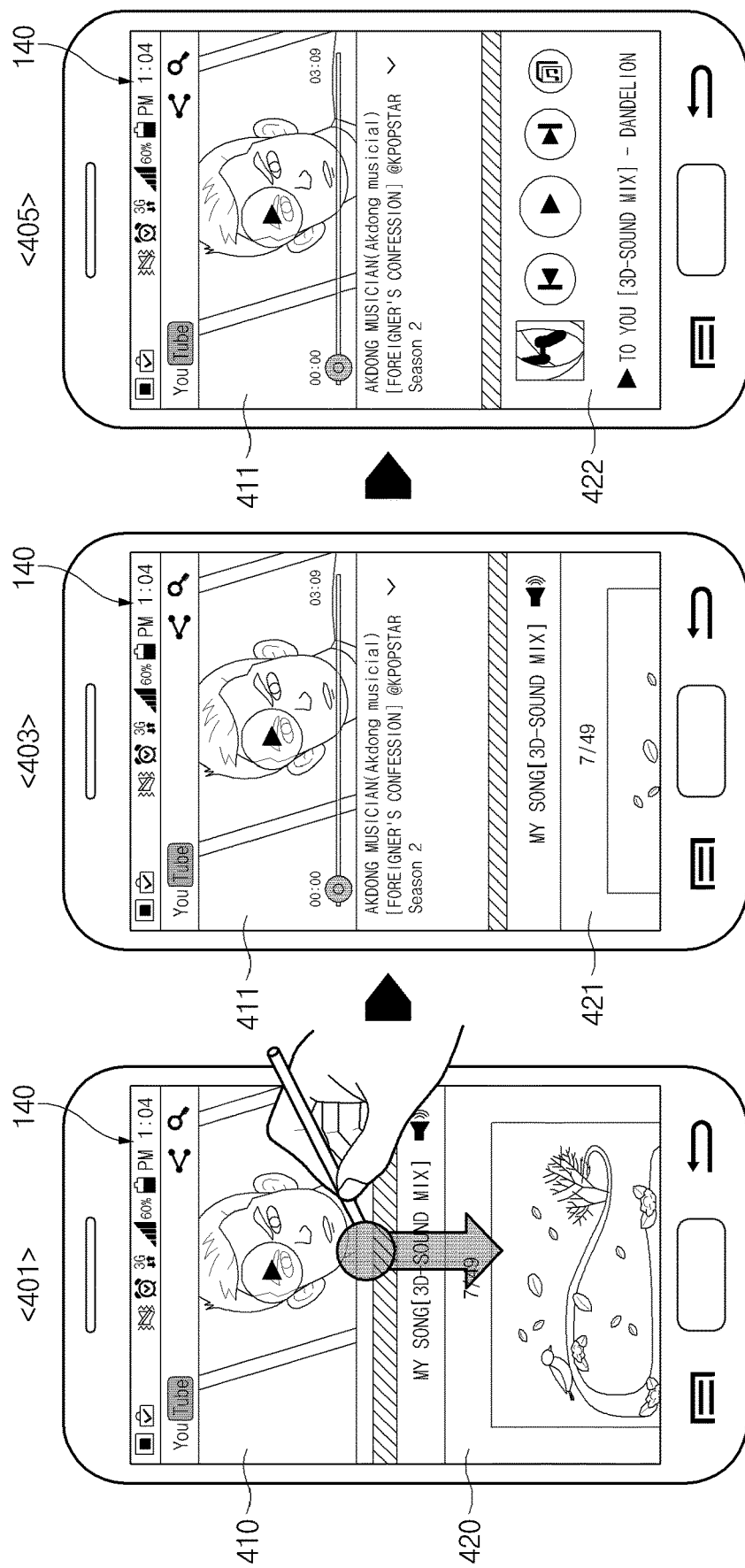
FIG. 4 illustrates an example screen interface related to another window display type change for a method of operating multiple windows according to an embodiment.

FIG. 4 illustrates an example screen interface related to another window display type change for a method of operating multiple windows according to an embodiment.

Referring to FIG. 4, the electronic device 100 may display, on the display module 140, a function-related window 410 in response to a function execution request. According to one embodiment, the electronic device 100 may receive a request to perform a second function while displaying, on the display module 140, the first function-related window 410. The electronic device 100 may adjust the first function-related window 410 and display simultaneously a second function-related window 420. For example, the electronic device 100 may display, on the display module 140, a first function-related window 410 and a second function-related window 420 as shown on a screen 401. The window 410 and the window 420 may be displayed in according to specified size information specified to be applied to each window when displayed in a multiple-window mode.

Also, according to various embodiments, a specific-type window displayed on the entire screen of the display module 140 for a first function may be changed to the window 410 having a different display type in response to a request for performing a second function. For example, the electronic device 100 may change a first function-related app window to a widget-type window together with displaying the window 420.

According to various embodiments, the window 420 may also be adaptively changed in display type according to the multiple-window environment. For example, even if widget execution for performing the second function is requested, the electronic device 100 may display an app window related to performing the second function as the window 420 to correspond to the window 410. Also, even if app execution for performing the second function is requested, the electronic device 100 may display a widget window related to performing the second function as the window 420 to correspond to the window 410. The screen 401 illustrates when a first function-related app window 410 and a second function-related app window 420 are displayed. As previously mentioned, such an environment may to be changed according to the characteristics of the window 410 and the window 420.

On the screen 401, an event related to adjusting the window 410 may occur. For example, the control module 160 may receive a touch event for adjusting the size of the window 410. The display module 140 may display a size adjusting window 411 that is scaled as shown on a screen 403 in response to the size adjustment of the window 410. Also, the display module 140 may display a size adjusting window 421 by adjusting the size of the window 420 in response to the display of the size adjusting window 411.

If the size of the size adjusting window 421 decreases or increases to a predefined certain size, the control module 160 may change the size adjusting window 421 to a changed window 422, as shown on a screen 405. According to various embodiments, the control module 160 may display the changed window 422 as on a screen 405 if, for example, a predefined time passes after the window 420 is changed to the size adjusting window 421. Alternatively, the control module 160 may change the window 420 to the change window 422 if the size of the window 420 is altered to be smaller than or equal to a predefined size. The changed window 422 may be different from the window 420 in terms of at least one of an information type, an information arrangement, a window size, a window location, or a window shape. The changed window 422 may be a window corresponding to program routine execution that is different from the window 420. A program related to the window 420 may deliver the previously mentioned execution information to a program related to executing the changed window 422. A program related to the changed window 422 may perform a second function based on the delivered execution information and display corresponding information.

Figure 5:
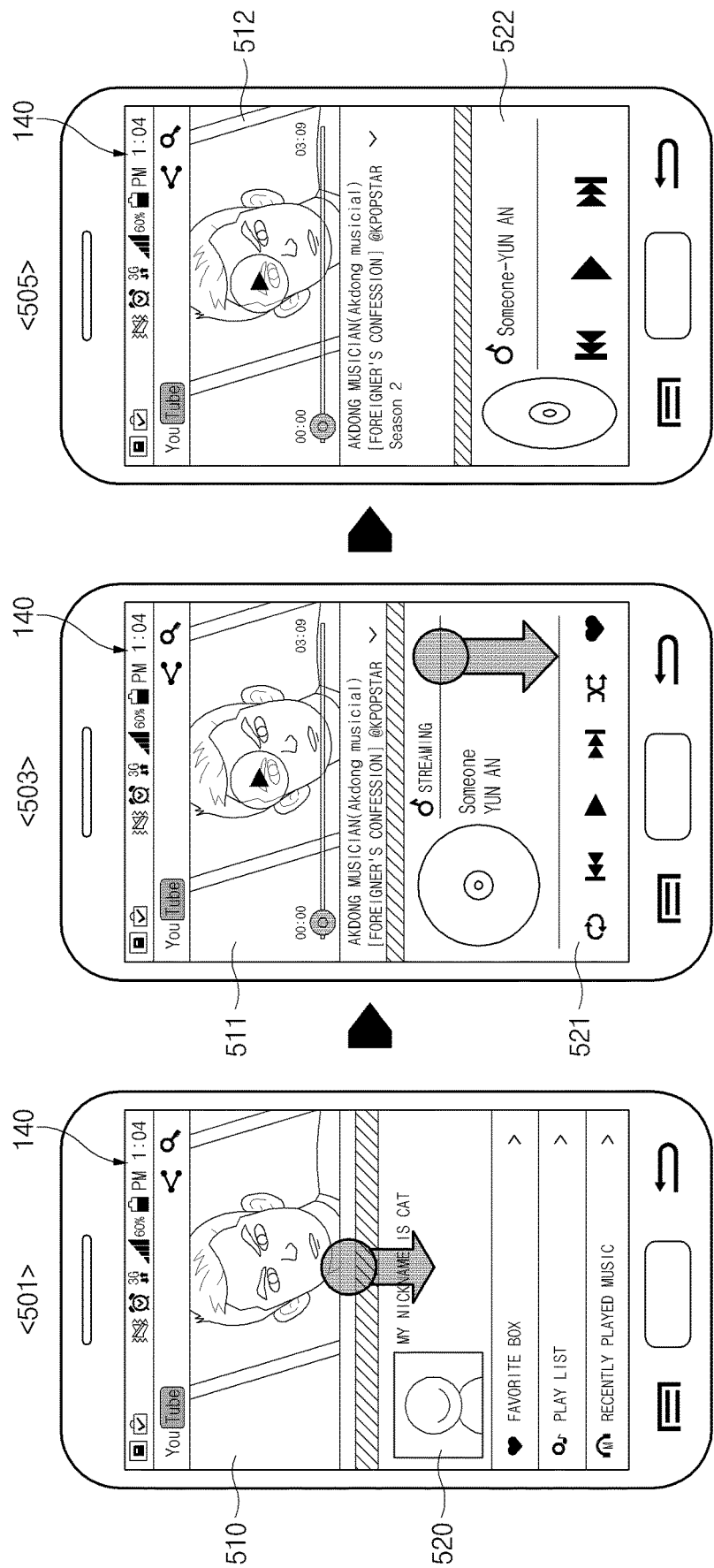

FIG. 5 illustrates an example screen interface related to another window display type change for a method of operating multiple windows according to an embodiment.

Referring to FIG. 5, a window 510 and a window 520 may be displayed according to a preset in a multiple-window environment as shown on a screen 501. The display formats of the window 510 and the window 520 may be adjusted according to the operation of multiple windows as described with respect to FIG. 4. In FIG. 5, for the purposes of illustration, window 510 and window 520 are displayed in app window formats, meaning that each represents a currently executing app.

On the screen 501, an event is detected related to adjusting the size of the window 510, such as, for example, a drag event. The control module 160 may adjust the size of the window 510 as the drag event occurs. Accordingly, the display module 140 may display a size adjusted window 511 as shown on a screen 503. The control module 160 may change the window 520 to a changed window 521, as shown on the screen 503, if the window 520 reaches a size smaller than or equal to a certain size in response to the size adjustment of the window 510.

The control module 160 may receive an event related to adjusting the size of the changed window 521. As shown on a screen 503, the display module 140 may display a size changed window 522 that is scaled in response to an event related to the size adjustment of the changed window 521. The control module 160 may further adjust the size of the window 511 that is scaled in response to the size adjustment of the changed window 521.

Accordingly, the display module 140 may display a size adjusting window 512 as shown on a screen 505.

Figure 6:
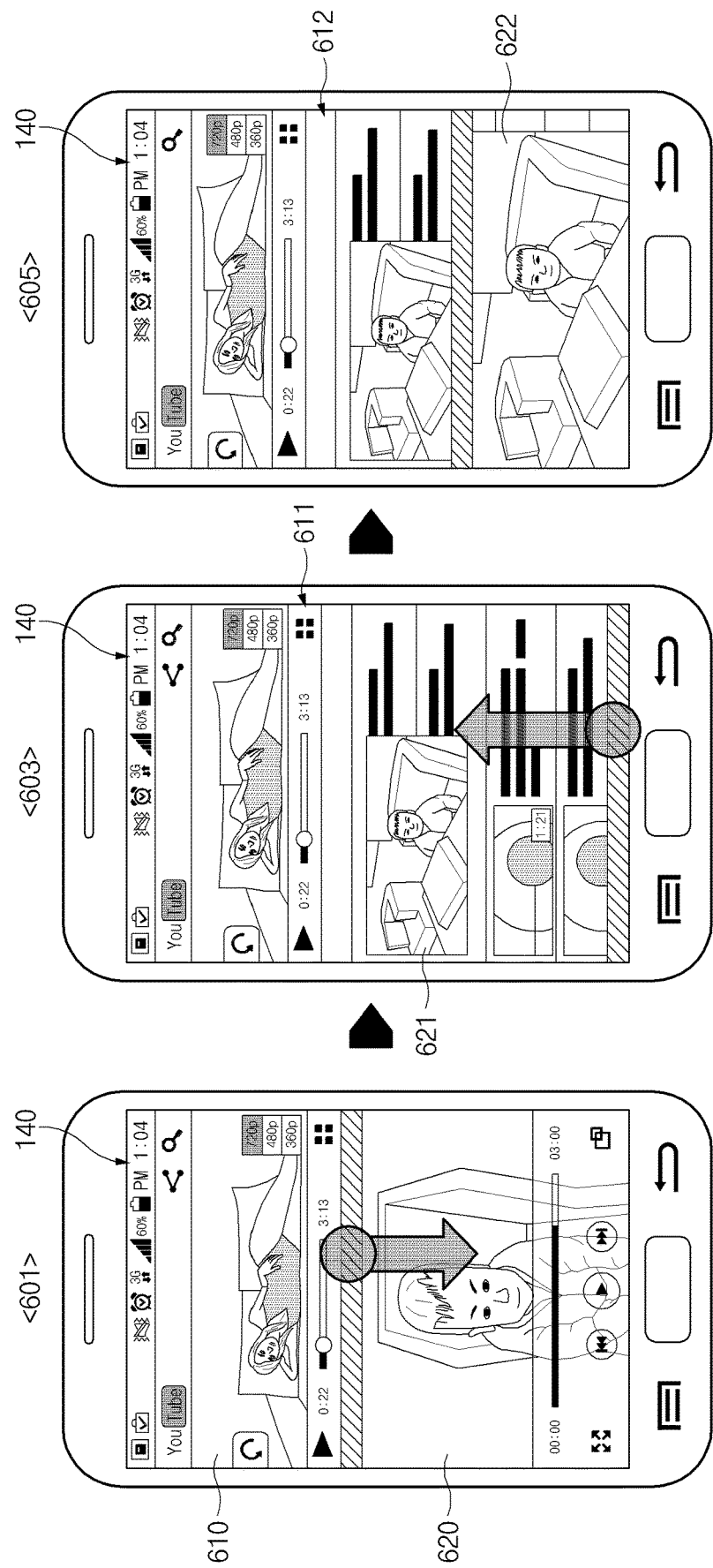
FIG. 6 illustrates an example screen interface related to another window display type change for a method of operating multiple windows according to an embodiment.

FIG. 6 illustrates an example screen interface related to another window display type change for a method of operating multiple windows according to an embodiment.

Referring to FIG. 6, a window 610 and a window 620 may be displayed on the display module 140 according to a preset as shown in screen 601. The display formats of the window 610 and the window 620 may be adjusted in terms of a display format or a display type according to the operation of multiple windows as described with respect to FIG. 4. In FIG. 6, the window 610 and the window 620 are, for the purposes of illustration, displayed as app window forms.

On the screen 601, the control module 160 may receive an event for adjusting the size of the window 610. For example, the control module 160 may receive a touch drag event in which the edge area of the window 610 is touched and then dragged in a certain direction. The display module 160 may change the window 610 to a full window 611 as shown on a screen 603 in response to the size of the touch drag event. For example, the control module 160 may control the display module 140 so that a first function-related window entirely occupies the display module 140 if the touch drag event occurs by a certain distance while expanding the size of the window 610 in response to the travel distance of the touch drag event. Accordingly, the display module 140 may change and display the window 610 to a full window 611.

The window 620 gradually decreases in size as the size of the window 610 is expanded. In addition, if the window 610 is changed to the full window 611, the window 620 may be changed to a pop-up window 621 as shown on a screen 603. The pop-up window 621 may be displayed on a specified location of the screen, or on the edge area of a screen. The pop-up window 621 may have a specified size.

As shown on the screen 603, the control module 160 may receive an event related to the size adjustment of the full window 611. For example, a touch drag event related to the size decrease of the full window 611 may occur. The control module 160 may gradually decrease the size of the full window 611 according to the touch drag event. The display module 140 may display a size adjusted window 612 as shown in response to the size decrease of the full window 611. Alternatively, if a sweep event or flick event having certain acceleration occurs, the control module 160 may change the full window 611 to a specified size adjusted window 612 in response to the occurrence of a corresponding event.

The control module 160 may change the pop-up window 621 to the size adjusted window 622 if the full window 611 is changed to the size adjusted window 612. The display module 140 may display the size adjusted window 622 on a certain location. For example, the display module 140 may display the size adjusted window 622 on empty areas of the screen, after the full window 611 is changed to the size adjusted window 622. Furthermore, the size adjusted window 622 may be adjusted in size according to the touch drag event. For example, the size of the size adjusted window 622 may be changed to the size of the window 620 according to the occurrence of the event.

Figure 7:
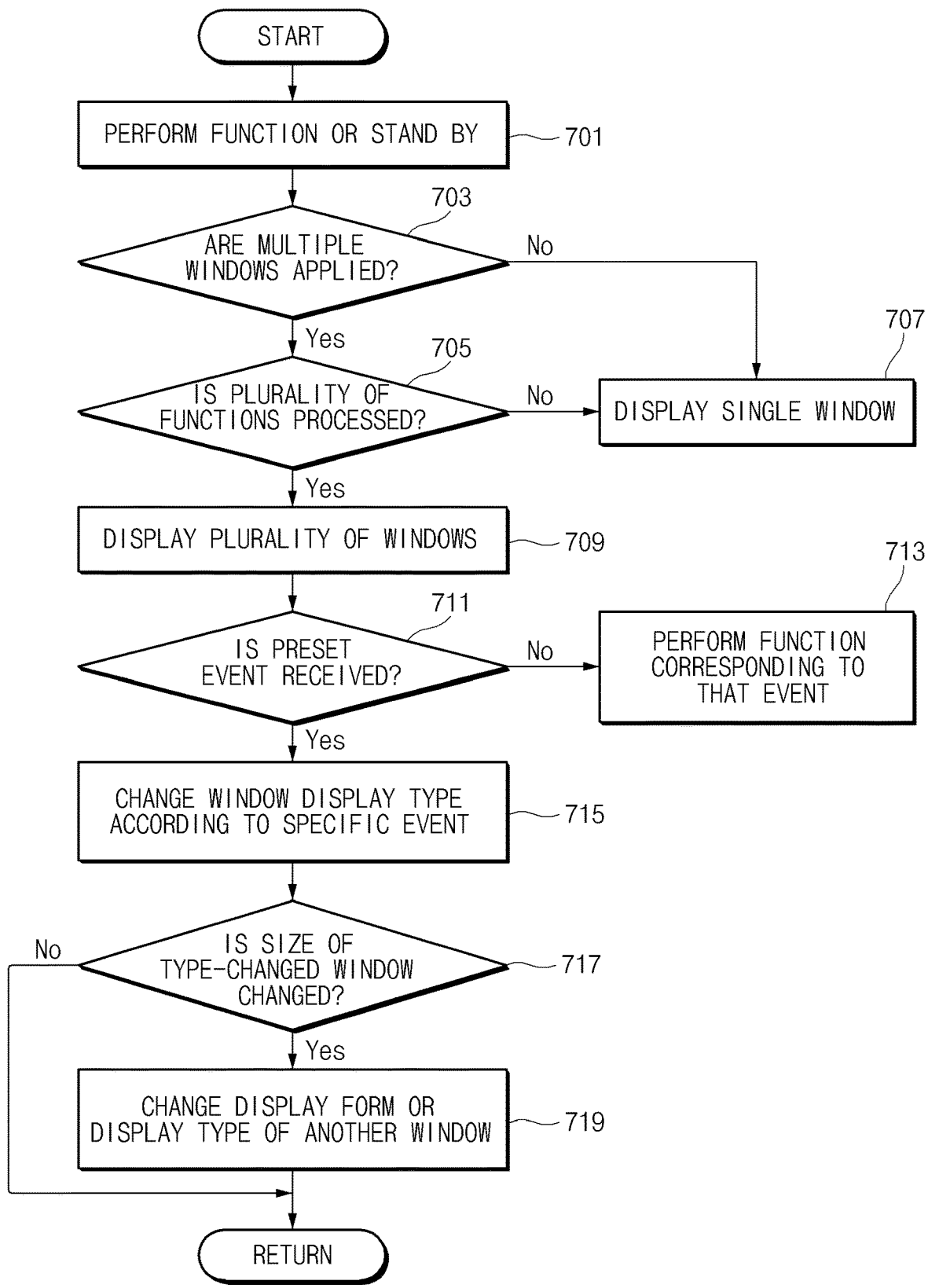
FIG. 7 is a flowchart illustrating an example method of operating the multiple windows of an electronic device according to an embodiment.

FIG. 7 is a flowchart illustrating an example method of operating the multiple windows of an electronic device according to an embodiment.

Referring to FIG. 7, operations 701 to 709 of the example method for operating multiple windows may be the same or similar to operations 401 to 409 described with respect to FIG. 4. For example, as in FIG. 4, the control module 160 may operate or wait for a function in operation 701. In operation 703, it is determined whether there is an event or setup related to applying the multiple window mode. If the multiple window mode is applied in operation 703, the control module 160 may check whether there is a need to process a plurality of functions in operation 705. If there is no request to apply the multiple to window mode in operation 703, or there is no need to process a plurality of functions in operation 705, the control module 160 may support a single window display in operation 707. If a plurality of functions is being executed in operation 705, the control module 160 may perform a multiple-window display mode in operation 709. The example operations of the electronic device 100 described with respect to FIG. 4 may also be applied to the present embodiment.

In operation 711, the electronic device 100 may determine whether a preset event is received. For example, the electronic device 100 may listen for receival of the preset input signal from a pre-specified event, depression of a key button, a gesture input, an audio input, or a message. The specific gesture input signal may also include various touch inputs, such as a sweep event, a flick event, a drag event, or a touch gesture event corresponding to a specific pattern. The specific gesture input signal may be an input signal that is obtained by analyzing sensor information collected from at least one sensor that is coupled to the electronic device 100. For example, the specific gesture input signal may be a sensor signal indicating tilting of the electronic device 100 in a certain direction, shaking the electronic device 100, or tapping the electronic device 100. Alternatively, the specific gesture input signal may also include a combination of a touch gesture signal and a sensor based gesture signal. As an example, the specific gesture input signal may include a touch signal and sensor input signal, thereby a combined signal of tilting or shaking the electronic device 100 while touching a specific window area.

If a preset event is not received in operation 711, the electronic device 100 may proceed to operation 713 and perform a function according to the characteristic of an occurred event. For example, the control module 160 may perform an information update on at least one of the currently displayed multiple windows in response to the occurred event.

If the preset event is received in operation 711, the control module 160 may perform a window display type change according to a specific event in operation 715. According to an embodiment, if a specific event occurs on a window designated by a touch event, the electronic device 160 may change the display type of the window designated in response. For example, the control module 160 may change an app window to a widget window in response to the occurrence of the touch event. Alternatively, the control module 160 may change a widget window to an app window.

In operation 717, the control module 160 may check whether a window altered by the display type change operation is changed in size. If the changed window has been altered in size, the control module 160 may change the display format or display type of another window correspondingly in operation 719.

Figure 8:
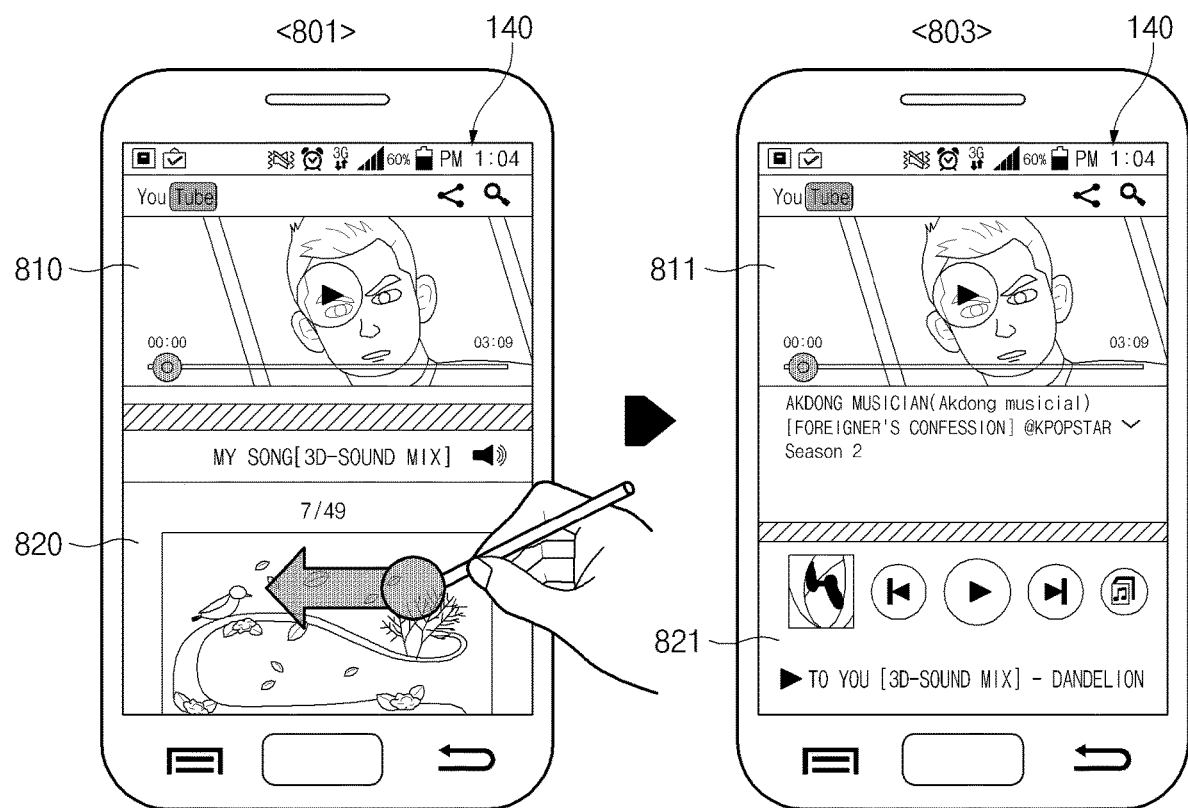
FIG. 8 illustrates an example screen interface related to the display type change of a designated window for a method of operating multiple windows.

FIG. 8 illustrates an example screen interface related to the display type change of a designated window for a method of operating multiple windows according to an embodiment.

Referring to FIG. 8, if a request to perform a first function and a second function is made, the control module 160 may perform the first function and the second function. The display module 140 may display a window 810 for the first function and a window 820 for the second function. According to various embodiments, the display module 140 may display a first function-related window 810 according to the request to perform the first function, and then display the second function-related window 820 according to a request for performing the second function. FIG. 8 illustrates the display in certain locations of the screen of an app window 810 provided as a result of executing a first function-related app, and an app window 820 provided as a result of executing a second function-related app.

Referring to a screen 801, the display module 140 displays the window 810 and the window 820 so that they occupy the entire screen. The control module 160 configures the window 810 and the window 820 at a certain ratio, for example, at a ratio of 1 to 1, according to specified information. Such a ratio may vary as the specified information changes. On the other hand, as shown on the screen 801, a preset event may occur on the window 820. The control module 160 may operate a touch panel in order to support an input function and detect receival of a preset event. If, for example, a drag event or a sweep event having a certain direction occurs, the control module 160 may check specified information and perceive the event as a preset event. The control module 160 may change the window 820 to a widget window 821, as shown on a screen 803, if the preset event occurs. When displaying the widget window 821, the electronic device 100 may have information to execute a second function related widget in response to the occurrence of a preset event in a multiple-window environment.

The display module 140 may substitute and display the widget window 821 for the window 820 in response to executing the second function-related widget. Here, the widget window 821 may have specified certain size information. According to an embodiment, the size of the widget window 821 may have a size smaller than the previously displayed window 820. The display module 140 may substitute and display the widget window 821 for the window 820, the widget window 821 being smaller than the window 820. The control module 160 may perform size adjustment on the window 810 in response to displaying the widget window 821. The display module 140 may display the window 821 that is formed after adjusting the size of the window 810.

On the other hand, if a preset event occurs on the widget window 821 of the screen 803, the control module 160 may control the display module to remove the widget window 821 and display the window 820. In this case, the control module 160 may perform the size adjustment of a size adjusted window 811. The display module 140 may return to a state to display the window 810 and the window 820 as shown on the screen 801.

Figure 9:
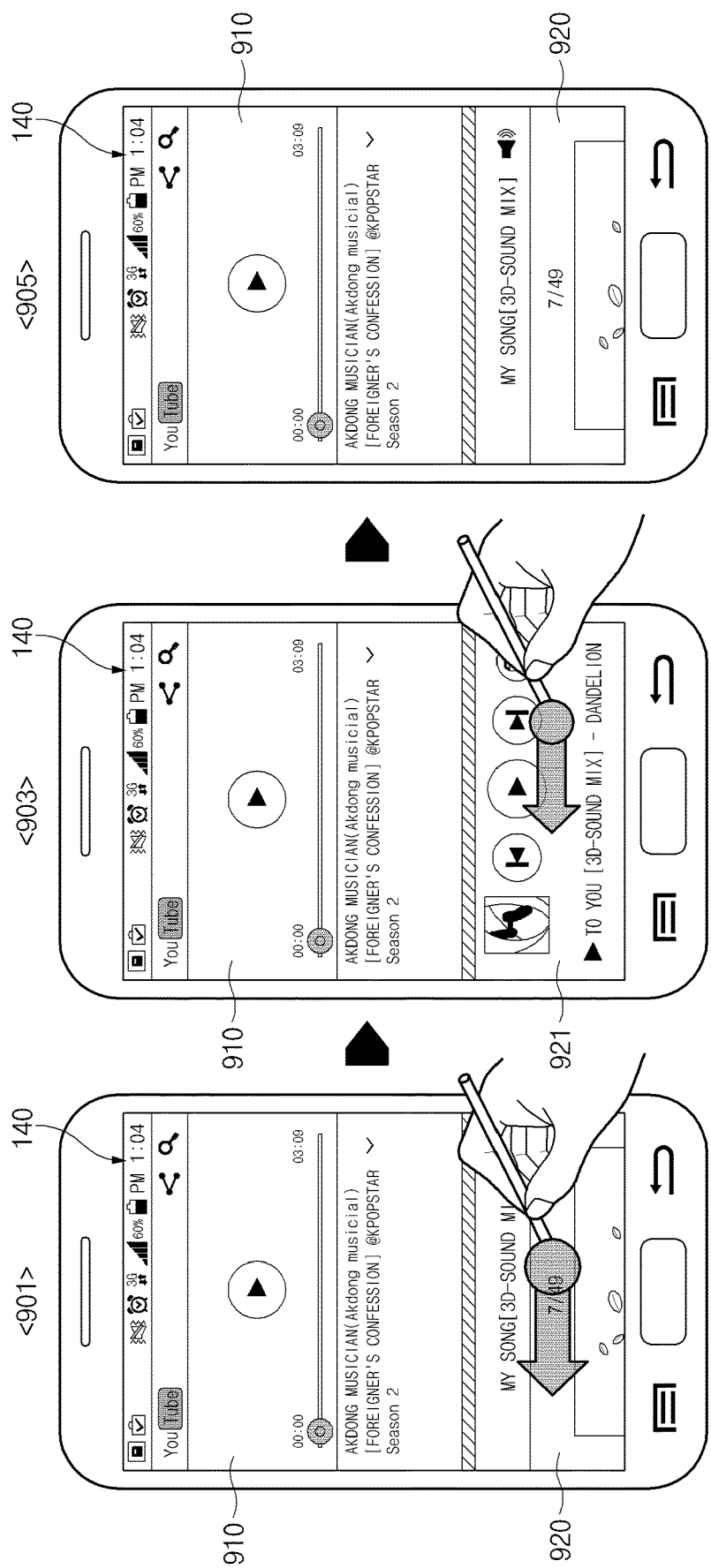

FIG. 9 illustrates an example screen interface related to a designated window display type change for a method of operating multiple windows according to an embodiment.

Referring to FIG. 9, if a request to perform a first function and a second function is made, the control module 160 may perform the first function and the second function. The display module 140 may display a first function related window 910 and a second function related window 920, as shown on a screen 901. According to various embodiments, the display module 140 may display a first-size window 910 related to the first function, and a window 920 having a second size different from the first size. Accordingly, FIG. 9 illustrates when the window 910 occupies a relatively wider area than the window 920.

Referring to the screen 901, the display module 140 may display the first-size window 910 on its upper part and the window 920 having the second size smaller than the first size on its lower part. Alternatively, after a first function-related window and a second function-related window that have the same size are displayed, the display module 140 may display the windows so that the size of the first function related window is larger than that of the second function related window in response to an input signal.

A preset event may occur on an area of the display module 140 on which the window 920 is displayed. The control module 160 may receive a preset event such as, for example, a touch event that corresponds to the operation of dragging or sweeping the window 920 in a certain direction. The control module 160 may switch the window 920 to a changed window 921 as shown on a screen 920 if the preset event occurs. The display module 140 may remove the window 920 as shown on the screen 901 or display the changed window 921 on the upper layer of the window 920. In this case, the changed window 921 may have the same size as the window 920. In response to the switch between the change window 921 and the window 920 that have the same size, the window 910 may maintain the previous state without a separate size switch.

On a screen 903, a preset event may occur on the display module 140 on which the changed window 921 is displayed. The control module 160 may switch the changed window 921 to the window 920 in response to the occurrence of the preset event. Accordingly, the display module 140 may remove the changed window 921 as shown on a screen 905 or display the window 920 on the upper layer of the changed window 921. That is, the window 920 may be switched to the changed window 921 in response to the occurrence of the preset event and, furthermore, the changed window 921 may be switched to the window 920 in response to the occurrence of the preset event.

Figure 10:
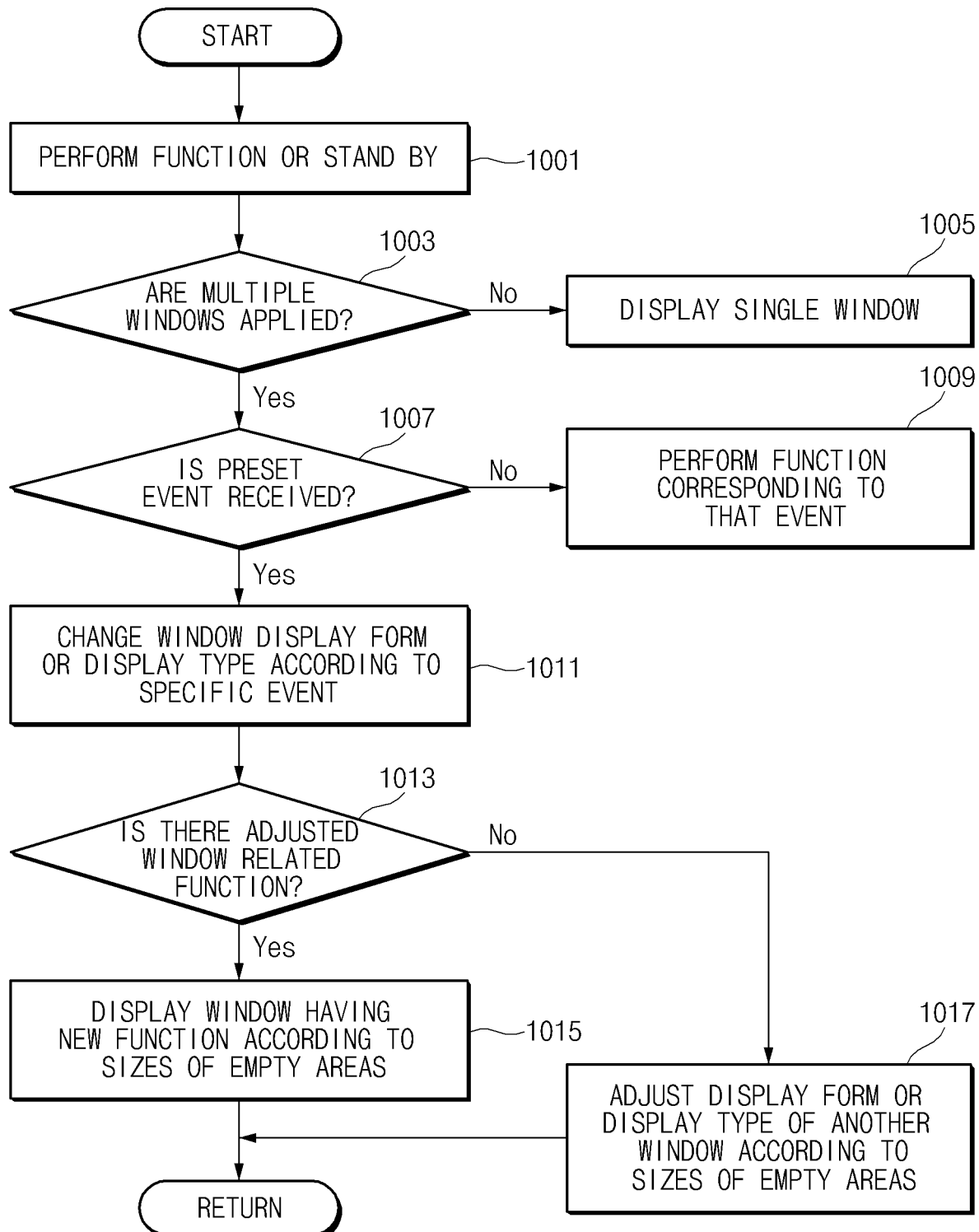
FIG. 10 is a flowchart illustrating an example method of operating the multiple windows of an electronic device according to an embodiment.

FIG. 10 is a flowchart illustrating an example method of operating the multiple windows of an electronic device according to an embodiment.

Referring to FIG. 10, in an example method of operating multiple windows, the control module 160 may first perform operating or waiting for a function in operation 1001. For example, the control module 160 may perform a specific function according to schedule information or in response to an input event, and display a corresponding screen. In operation 1003, the control module 160 may check whether to execute a multiple window mode(or multiple window function). For example, the control module 160 may check whether there is a multiple-window mode or an input event to request to activate the multiple-window mode. If there is no request to execute the multiple window mode in operation 1003, the control module 160 may support applying a single window mode in operation 1005.

If there is a request for executing the multiple window mode in operation 1003, the control module 160 may arrange a plurality of windows in a certain format. In operation 1007, the control module 160 may check whether a preset event is received. Here, the preset event may be at least one of various events or gesture input signals that are described in operation 711 of FIG. 7. If the preset event is not received in operation 1007, the control module 160 may proceed to operation 1009 to control performing a function that is dependent on the type or characteristic of a corresponding event. For example, the control module 160 may perform volume control or a page switch for a function or program that is already being executed.

If the preset event is received in operation 1007, the control module 160 may adjust the window display format or display type according to the preset event in operation 1011. For example, the control module 160 may perform size adjustment on a specific window in response to an event. Alternatively, the control module 160 may switch the display type of the specific window to another display type in response to an event.

In operation 1013, the control module 160 may check whether there is an adjusted window-related function. The electronic device 100 may associate at least one specific function with another function. According to various embodiments, the electronic device 100 may associate a memo function with a video playback function or a music playback function. The electronic device 100 may associate a file edit function with a chatting function. The electronic device 100 may associate a web access function with the memo function. The electronic device 100 may associate the web access function with a dictionary function. The electronic device 100 may associate a call function with the memo function. The electronic device 100 may associate a scheduler function with the memo function. The electronic device 100 may associate the call function with a language conversion function. The electronic device 100 may associate a camera function with the memo function or a gallery function. The electronic device 100 may store associated information in the storage module 150. If the size of a specific window is adjusted or the display type thereof is changed, the control module 160 may check a function associated with a corresponding function based on the associated information stored in the storage module 150. If there is no adjusted window-related function in operation 1013, the control module 160 may adjust the display format or display type of a window dependent on the sizes of empty unused areas of the display in operation 1017. Alternatively, the control module 160 may maintain empty areas, leaving them empty, filled with specific colors, or displaying the background screen.

If there is a program related to a specific function in operation 1013, the control module 160 may display a window having a new function according to the sizes of empty areas. For example, the control module 160 may determine a function associated with an adjusted window as a specific display type and display a window corresponding to that display type. According to an embodiment, the control module 160 may display an app window or a widget window corresponding to a new function according to the adjusted size or adjusted display type of the adjusted window. In this case, the control module 160 may adjust the size of an app window or a widget window according to the size of the adjusted window. Alternatively, the control module 160 may further adjust the size of the adjusted window for displaying an app window or a widget window that have a certain size.

As described above, the method of operating the multiple windows according to various embodiments may include displaying a plurality of windows provided as a result of performing functions, changing at least one of the display format of a first function-related window of the plurality of windows, or a window display type according to execution of another program having the same or similar functionality as the first function in response to the occurrence of an event, and displaying a second function-related window of the plurality of windows in response to the change of the first function-related window, by changing a window display type according to executing another program having the same or similar functionality as the second function, or a new third function related window.

According to various embodiments, the display operation may include changing the display type of the second function-related window if a size change is equal to or larger than a certain level in regard to the display format of the first function-related window.

According to various embodiments, the display operation may include displaying the third function-related window if the size change of the first function-related window or the size change of the second function-related window is equal to or larger than a certain level.

According to various embodiments, the method may further include performing the third function previously associated with the first function or the second function based on associated information, and may include displaying the third function-related window provided as a result of performing the third function.

According to various embodiments, the display operation may include changing the first function-related window to a window having a preset size in response the occurrence of an event, and displaying the third function-related window of which the display type is different, depending on the sizes of empty areas generated by the change of the first function-related window.

According to various embodiments, the method may further include receiving the event, and adjusting the size of the second function-related window having a changed display type in response to the reception of the event.

According to various embodiments, the method may further include receiving the event, and again changing the display type of the first function-related window or the second function-related window in response to the reception of the event.

Figure 11:
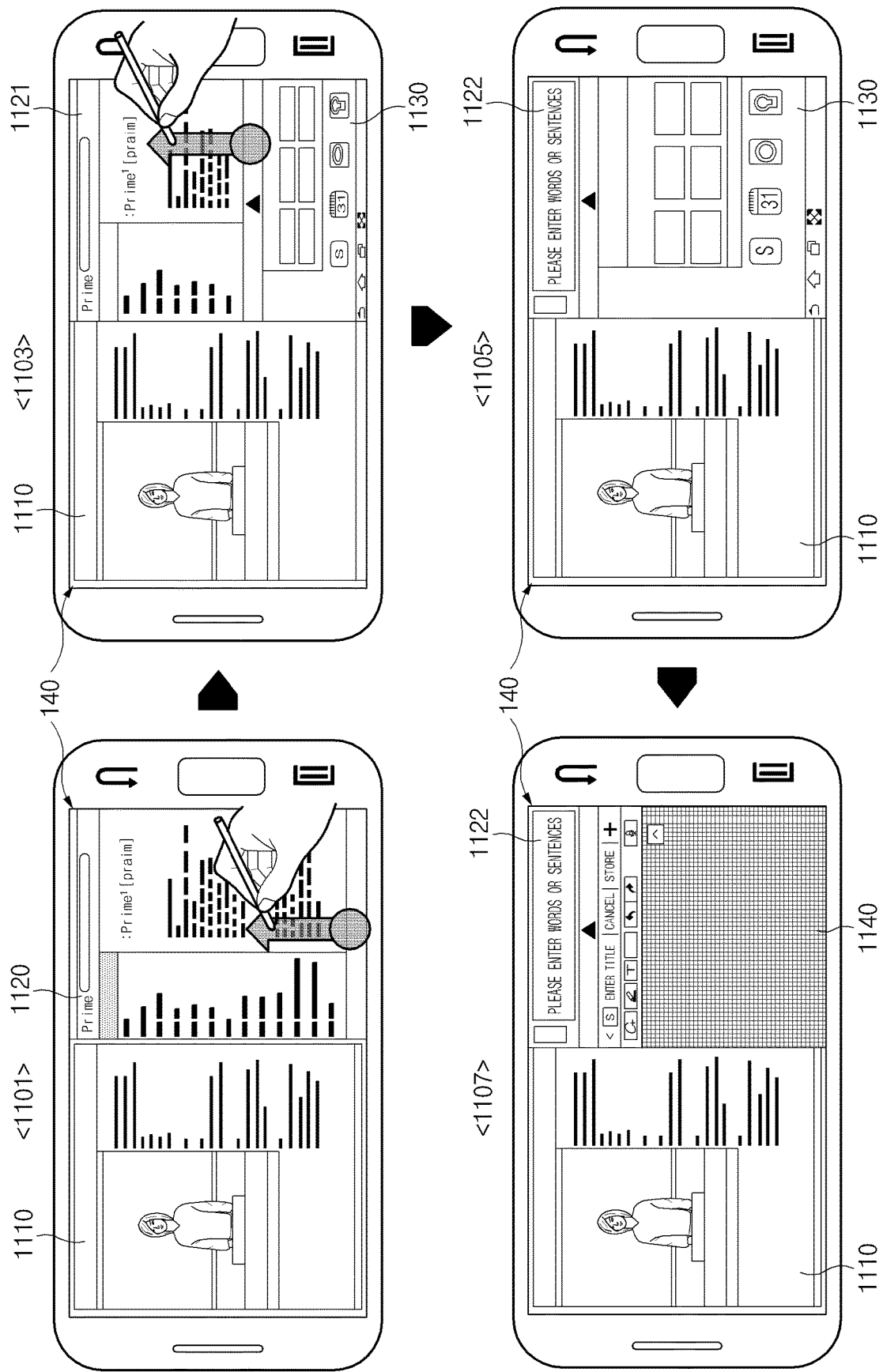
FIG. 11 illustrates an example screen interface related to a new window display for a method of operating multiple windows according to an embodiment.

FIG. 11 illustrates an example screen interface related to a new window display for a method of operating multiple windows according to an embodiment.

Referring to FIG. 11, the control module 160 of the electronic device 100 may display, on the display module 140, multiple windows provided as a result of performing a plurality of functions. For example, the display module 140 may display a window 1110 provided as a result of performing a first function and a window 1120 provided as a result of performing a second function as shown on a screen 1101. The windows 1110 and the window 1120 may be displayed on the entire screen of the display module 140, each window occupying a certain area.

The control module 160 may receive an event for adjusting the display format of the window 1120. For example, a user may create a drag event by using an electronic pen or his/her fingers to adjust the display form of the window 1120. The control module 160 may adjust the display form of the window 1120 in response to the event. For example, the control module 160 may adjust the size of the window 1120 in response to a drag event, and display a size adjusting window 1121 as shown on a screen 1103. Here, the control module 160 may display a new function related window 1130 on empty areas generated due to the display of the size adjusting window 1121.

According to an embodiment, the new function related window 1130 may be a window having another function that is arranged on a background area of the window 1121 or may be at least some areas of the background screen. The window 1121 may be layered and displayed on the background screen or a window having a different function. If the size of the window 1121 is adjusted and empty areas are provided, the control module 160 may display, on the empty areas, at least a portion of the background screen or a window having a different function. In this case, the control module 160 may readjust information included in the background screen according to the sizes of the empty areas and display at least a portion of the background screen on the empty areas. Alternatively, the control module 160 may display, on the empty areas, reduced information on the background screen. Alternatively, the control module 160 may display, on the empty areas, some areas of a window having a different function, or reduce and display the window having the different function. Alternatively, the control module 160 may display, on the empty areas, a window having a different function suitable for the empty areas. For example, if there are various windows such as an app window, a widget window, etc., the control module 160 may execute a widget or an app suitable for the sizes of corresponding empty areas and display a window provided as a result of execution.

According to another embodiment, the new function related window 1130 may be a window that is provided as a result of performing a specific function that is previously associated with a second function. If the size of the window 1120 is adjusted or the adjusted size is equal to or larger than a certain level, the control module 160 may check associated information stored in the storage module 150. The control module 160 may check a new function associated with the second function and check the sizes of empty areas. The control module 160 may execute a program suitable for the sizes of the empty areas. The display module 140 may display, on the empty areas, the new function related window 1130 provided as a result of executing a program.

According to various embodiments, an event for adjusting the display format of the size adjusted window 1121 may occur. For example, a user may perform a drag operation for further adjusting the size of the size adjusting window 1121. If an event resulting from the drag operation is received, the control module 160 may further adjust the display format of the size adjusting window 1121 and display a further adjusting window 1131 as shown on a screen 1105. Here, the control module 160 may execute another program related to the second function if the display format of the size adjusting window 1121 is adjusted so that the size of the window is equal to or smaller than a certain size. The display module 140 may display, on an area of the further adjusted window 1131, a window provided as a result of executing a corresponding program.

The control module 160 may adjust at least one of the display format or display type of the new function-related window 1130 in response to the further adjustment of the size adjusting window 1121. For example, the control module 160 may expand the new function related window 1130 to empty areas generated due to the reduction of the size adjusting window 1121. The display module 140 may display the expanded new function-related window 1130. Alternatively, if the empty areas are expanded due to the reduction of the size adjusted window 1121, the control module 160 may execute a new function-related program suitable for the expanded empty areas. The display module 140 may display a new function-related window 1140 provided as a result of executing the new function related program as shown on a screen 1107. According to an embodiment, the control module 140 may perform a gallery function as a function associated with the second function on screens 1103 and 1105. If the empty areas due to the size adjustment of the window 1120 are expanded to have a size equal to or larger than a certain size, the control module 160 may perform a memo function as a new function. The display module 140 may display the new function-related window 1140 provided as a result of performing the memo function. The associated information may include information on functions associated with a specific function according to the sizes of empty areas.

Figure 12:
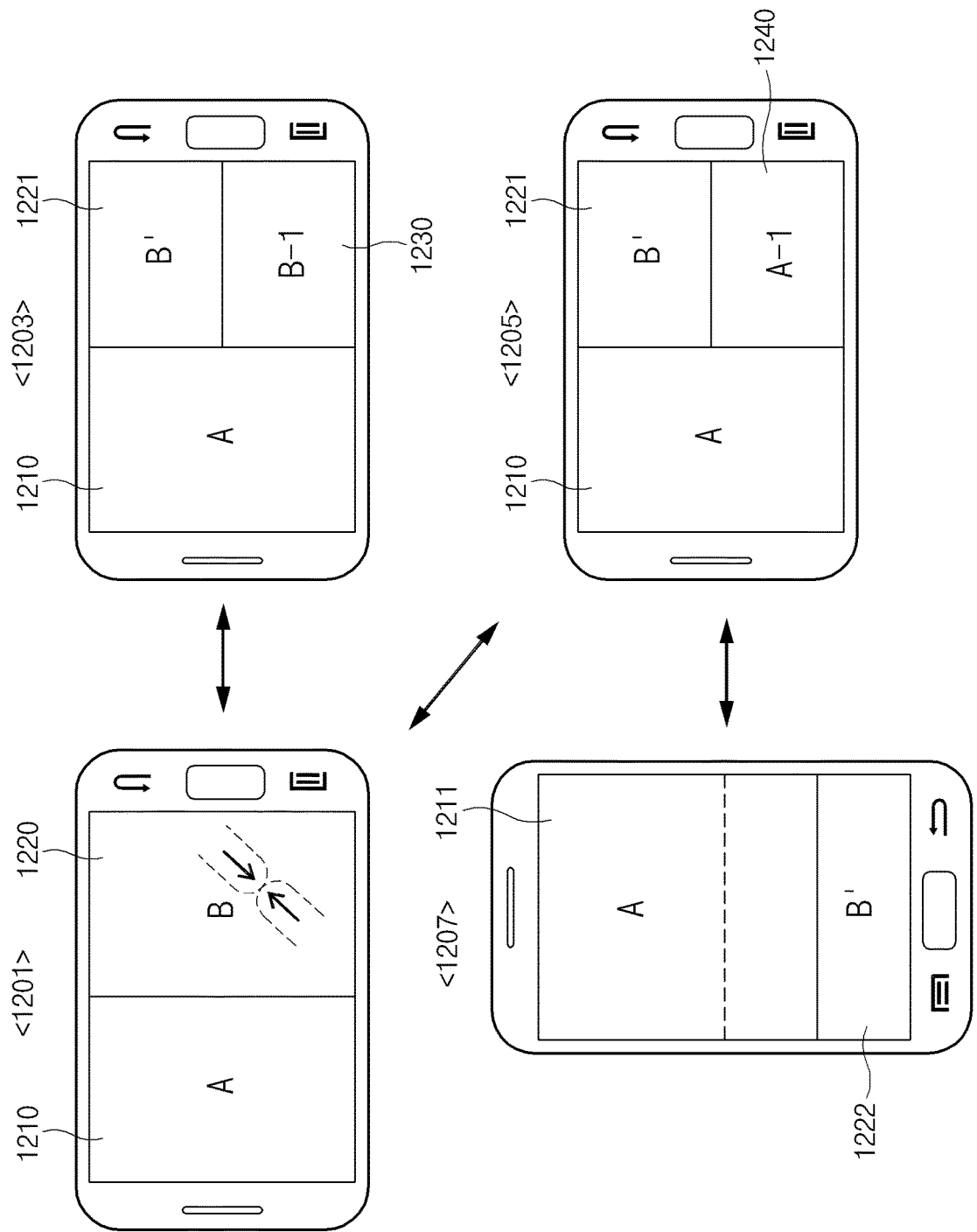
FIG. 12 illustrates various examples of a screen interface for operation of multiple windows that may be applied to various embodiments.

FIG. 12 illustrates various examples of a screen interface for operation of multiple windows that may be applied to various embodiments.

Referring to FIG. 12, the display module 140 of the electronic device 100 may display a plurality of windows provided as a result of an environment supporting multiple windows as illustrated on a screen 1201. For example, the display module 140 may display a first function-related window 1210 and a second function-related window 1220.

Here, a preset event for adjusting the display format of the window 1220 may occur. For example, the control module 160 may receive a preset event such as a multiple-touch event, a zoom-in or zoom-out event, etc. If the preset event occurs, the display module 140 may adjust the display format of the window 1220 to display a size adjusting window 1221, and also display a third function related window 1230 associated with the second function, as shown on a screen 1203. According to various embodiments, the control module 160 may adjust the size of the window 1220 according to receiving a preset event, or display a window provided as a result of executing another program having the same or similar function as the window 1220. For example, the window 1220 may be a window provided as a result of executing an app program, and the size adjusted window 1221 may be a window provided as a result of executing a widget program. The control module 160 may check associated information to display the window 1230. The control module 160 may check a third function associated with the second function. The control module 160 may perform the third function. The display module 140 may display the window 1230 provided as a result of performing the third function. The control module 160 may control the display module 140 so that the size adjusting window 1221 having a preset size and the window 1230 having a preset size are display in response to the occurrence of a preset event.

According to an embodiment, if the preset event is received on the window 1220 or the display module 140, the control module 160 may perform a fourth function associated with the first function. The control module 160 may adjust the size of the window 1220 to change to a predefined size adjusting window 1221. Alternatively, the control module 160 may execute a second function related program having a different display type and control the display of the size adjusting window 1221. The display module 140 may display a fourth function related window 1240 on empty areas generated due to the display of the size adjusting window 1221 as shown on a screen 1205.

According to various embodiments, if a preset event occurs on the window 1210, the control module 160 may perform the third function associated with the second function. In addition, the control module 160 may adjust the display form or display type of the window 1210 to provide empty areas and may arrange a window having the third function on the empty areas.

According to various embodiments, the control module 160 may adjust the display format of the window 1220 if the preset event is received. The control module 160 may adjust the display format of the window 1210 in response to the display format adjustment of the window 1220. The display module 140 may display a window 1222 of which the size and direction are adjusted as shown on a screen 1207. Also, the display module 140 may display a window 1211 of which the size and direction are adjusted. For example, the display module 140 may change horizontal-mode windows to vertical-mode windows and display them.

As described above, for a screen display provided as a result of performing a multiple window function described in various example embodiments detailing possible arrangements between multiple windows, adding related information, automatic and adaptive change in display format. Thus, the various example embodiments enable easy user access to information for a variety or apps and widgets without requiring an input operation for further and repetitive display window switching or adjustment.

On the other hand, according to various embodiments, the control module 160 of the above-described electronic device 100 may include buses and at least one processor. Here, the processor may include, for example, at least one of the event collecting module 161, the function processing module 163, or the output processing module 165 that are described above with respect to the electronic device 100. Alternatively, processing modules included in the function processing module 163 may be implemented as at least one processor.

The buses may be circuits that connect components in electronic devices and that deliver communication (for example, control messages) between the components, and may include hardware modules such as, for example, processors, storage modules, input modules, display modules or communication modules.

The processor may receive commands through the buses from the components included in the electronic devices, decrypt the received commands and perform calculation or data processing according to the decrypted commands. In this case, the processor executes at least one application stored in the storage module 150 and provides a service based on a corresponding application.

Also, the processor may include one or more application processors (APs) or one or more communication processors (CPs). Here, the AP or the CP may be included in a processor or they may be included in different IC packages respectively. Also, the AP or the CP may also be included in one IC package. The AP may execute operating system or application programs to control a plurality of hardware and software components connected to the AP and may perform processing and calculation on various data including multimedia data. Here, the AP may be implemented as a system on chip (SoC). Also, the CP may perform at least some of multimedia control functions. Also, the CP may use a subscriber identification module (for example, SIM card) to identify and authenticate terminals in a communication network. In this case, the CP may provide a service including voice call, video call, text message or packet data service. Also, the CP may perform the data transmission/reception of the communication module 260. The AP or the CP may load, on volatile memories, commands or data read from non-volatile memories connected to the AP or the CP or from at least one of other components and may process the commands or data. Also the AP or the CP may store, in non-volatile memories, data received from at least one of other components or generated by at least one of other components. The CP may manage a data link when communicating between other electronic devices connected to an electronic device over a network, and perform a function to convert a communication protocol. Further, the processor may further include a graphic processing unit (GPU). On the other hand, many variations may be made due to the convergence trend of digital devices and thus entire enumerations are not possible. It should be understood that the electronic device 100 may further include components not mentioned above, such as an acceleration sensor, a gyro sensor, a GPS module, a near field communication (NFC) module, a vibration motor, an accessory, etc. Also, for the electronic device 100, specific components may be removed from components above or replaced with other components depending on the situation.

According to the method of operating the multiple windows and the electronic device supporting the same that are proposed in various embodiments as described above, various embodiments simplify manipulating the multiple windows.

In addition, embodiments of the present disclosure disclosed in the specification and the drawings merely present specific examples to easily describe the technical details of the present disclosure and help to understand the present disclosure, and are not intended to limit the present disclosure. Thus, it should be construed that all changes or modified forms that may be derived from the technical aspects of the present disclosure in addition to the disclosed embodiments are included in the present disclosure.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

The functions and process steps herein may be performed automatically or wholly or partially in response to user command. An activity (including a step) performed automatically is performed in response to executable instruction or device operation without user direct initiation of the activity.

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. § 101 and does not constitute software per se.

What is claimed is:

1. An electronic device, comprising:
a display; a processor; and a memory operatively connected to the processor, wherein the memory stores instructions executable by the processor to cause the electronic device to:
display a first window corresponding to a first application and a second window corresponding to a second application on the display, the first window and the second window separated by a boundary line,
receive a first user input moving in a first direction from an edge of the second window, in response to the first user input, display a third window corresponding to a third application on at least portion of an area corresponding to the first window or the second window,
while displaying the third window with the first and second windows, receive a second user,
in response to receiving the second user input, remove the third window and display a fourth window corresponding to a fourth application in an area where the third window is output,
wherein a direction of the second user input is the same as the first direction of the first user input, and
wherein the second user input is a touch drag input with respect to the third window.

2. The electronic device of claim 1, wherein the memory stores instructions executable by the processor to cause the electronic device to:
receive a third user input for moving the boundary line between the first window and the second window,
when the boundary line is moved in a first direction according to the third user input, increase a size of the first window, add a first visual element to the first window as the first window is increased in size, and decrease a size of the second window,
when the boundary line is moved in a second direction different from the first direction according to the third user input, increase a size of the second window, add a second visual element to the second window as the second window is increased in size, and decrease a size of the first window.

3. The electronic device of claim 1, wherein the third window corresponding to execution of the third application or the fourth window corresponding to execution of the fourth application displays on a location spaced a certain distance from the boundary line.

4. The electronic device of claim 1, wherein in response to detecting the first user input on the edge, retrieve one or more applications from background execution for display, and
wherein the retrieved one or more applications corresponds to the third window.

5. The electronic device of claim 1, wherein the instructions are further executable by the processor to reduce a display size of the second window so as to display the third window.

6. The electronic device of claim 5, wherein an original display size of the first window is maintained, while the second window is reduced in response to displaying the third window.

7. The electronic device of claim 1, wherein the third window displays on a location spaced a certain distance from the boundary line of the first window.

8. The electronic device of claim 1, wherein the first user input is a touch drag input from the edge of the second window.

9. A method of an electronic device, comprising:
displaying, via a display of the electronic device, a first window corresponding to a first application and a second window corresponding to a second application on the display, the first window and the second window separated by a boundary line,
receiving, via an input circuit of the electronic device, a first user input moving in a first direction from an edge of the second window, in response to the first user input, displaying a third window corresponding to a third application on at least portion of an area corresponding to the first window or the second window,
while displaying the third window with the first and second windows, receiving a second user input, in response to receiving the second user input, removing the third window and displaying a fourth window corresponding to a fourth application in an area where the third window is output,
wherein a direction of the second user input is the same as the first direction of the first user input, and
wherein the second user input is a touch drag input with respect to the third window.

10. The method of claim 9, further comprising:
receiving a third user input for moving the boundary line between the first window and the second window, and
when the boundary line is moved in a first direction according to the third user input, increasing a size of the first window, adding a first visual element to the first window as the first window is increased in size, and decreasing a size of the second window,
when the boundary line is moved in a second direction different from the first direction according to the third user input, increasing a size of the second window, adding a second visual element to the second window as the second window is increased in size, and decreasing a size of the first window.

11. The method of claim 9, wherein the third window corresponding to execution of the third application or the fourth window corresponding to execution of the fourth application displays on a location spaced a certain distance from the boundary line.

12. The method of claim 9, wherein in response to detecting the first user input on the edge, retrieve one or more applications from background execution for display, and
wherein the retrieved one or more applications corresponds to the third window.

13. The method of claim 9, further comprising:
reducing a display size of the second window so as to display the third window.

14. The method of claim 13, wherein an original display size of the first window is maintained, while the second window is reduced in response to displaying the third window.

15. The method of claim 9, wherein the third window displays on a location spaced a certain distance from the boundary line of the first window.

16. The method of claim 9, the first user input is a touch drag input from the edge of the second window.

17. A non-transitory computer-readable medium storing instructions, the instructions executable by at least one processor of an electronic device to cause the electronic device to:
display, via a display of the electronic device, a first window corresponding to a first application and a second window corresponding to a second application on the display, the first window and the second window separated by a boundary line,
receive, via an input circuit of the electronic device, a first user input moving in a first direction from an edge of the second window, in response to the first user input, display a third window corresponding to a third application on at least portion of an area corresponding to the first window or the second window,
while displaying the third window with the first and second windows, receive a second user input, in response to receiving the second user input, remove the third window and display a fourth window corresponding to a fourth application in an area where the third window is output,
wherein a direction of the second user input is the same as the first direction of the first user input, and
wherein the second user input is a touch drag input with respect to the third window.

18. The non-transitory computer-readable medium of claim 17, wherein the first user input is a touch drag input from the edge of the second window.

* * * * *